US006973506B2

(12) United States Patent
Ishiyama et al.

(10) Patent No.: US 6,973,506 B2
(45) Date of Patent: Dec. 6, 2005

(54) POSITION IDENTIFIER MANAGEMENT APPARATUS AND METHOD, MOBILE COMPUTER, AND POSITION IDENTIFIER PROCESSING METHOD

(75) Inventors: Masahiro Ishiyama, Tokyo (JP); Atsushi Inoue, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 697 days.

(21) Appl. No.: 09/771,972

(22) Filed: Jan. 30, 2001

(65) Prior Publication Data

US 2001/0014917 A1   Aug. 16, 2001

(30) Foreign Application Priority Data

Feb. 15, 2000 (JP) ............................ 2000-036693

(51) Int. Cl.⁷ ............................................. G06F 15/16
(52) U.S. Cl. ...................... 709/245; 709/202; 709/217; 709/218; 709/226; 709/228; 709/230; 709/232; 370/389; 370/393; 370/400; 455/433
(58) Field of Search ................................ 709/200, 253, 709/202, 217, 218, 226, 228, 230, 232, 245; 370/400, 389, 393; 455/433

(56) References Cited

U.S. PATENT DOCUMENTS

| | | | |
|---|---|---|---|
| 6,088,725 A | | 7/2000 | Kondo et al. |
| 6,160,804 A | * | 12/2000 | Ahmed et al. ............... 370/349 |
| 6,442,616 B1 | * | 8/2002 | Inoue et al. ................. 709/245 |
| 6,501,767 B1 | * | 12/2002 | Inoue et al. ................. 370/465 |
| 6,510,153 B1 | * | 1/2003 | Inoue et al. ................. 370/354 |
| 6,515,974 B1 | * | 2/2003 | Inoue et al. ................. 370/331 |
| 6,654,607 B1 | * | 11/2003 | Shobatake et al. .......... 455/433 |
| 6,735,202 B1 | * | 5/2004 | Ahmed et al. ............... 370/392 |
| 6,751,459 B1 | * | 6/2004 | Lee et al. .................... 455/445 |

FOREIGN PATENT DOCUMENTS

| | | |
|---|---|---|
| JP | 10-51449 | 2/1998 |
| JP | 11-249943 | 9/1999 |
| JP | 2001-268129 | 9/2001 |

OTHER PUBLICATIONS

S. Thomson, "IPv6 Stateless Address Autoconfiguration", Dec. 1998, pp. 1-25.
P. Mockapetris, "Domain Names—Concepts and Facilities", Nov. 1987, pp. 1-55.
Fumio Teraoka, et al., "Location Transparent Inter-Object Communication in the Muse Operating System", ARC, vol. 90, No. 29, Apr. 20, 1990, pp. 1-8, (with English Abstract).

* cited by examiner

*Primary Examiner*—Nabil El-Hady
(74) *Attorney, Agent, or Firm*—Oblon, Spivak, McClelland, Maier & Neustadt, P.C.

(57) ABSTRACT

When a first mobile node is moved, it reports binding information including a compatible node identifier (virtual mobile guaranteed general network identifier and a node identifier) and a compatible position identifier to a first server which is assigned to the first mobile node. A second mobile node reports the binding information to a second server. For communicating with the second mobile node to which a second server is assigned, if the destination address of a packet addressed to the second mobile node is designated with a compatible node identifier, the first mobile node acquires the binding information of the second mobile node from the second server. Then, the first mobile node converts the destination address of the packet into the acquired compatible position identifier and sets the compatible position identifier of the first mobile node as the source address of the packet. The first mobile node then transmits the packet.

21 Claims, 10 Drawing Sheets

FIG. 2

| COMPATIBLE NODE IDENTIFIER | COMPATIBLE POSITION IDENTIFIER | REGISTERED TIME | EFFECTIVE PERIOD |
|---|---|---|---|
| Oi1 | L1i1 | T1 | LT1 |

FIG. 3

| COMPATIBLE NODE IDENTIFIER | COMPATIBLE POSITION IDENTIFIER | REGISTERED TIME | EFFECTIVE PERIOD |
|---|---|---|---|
| Oi2 | L3i2 | T2 | LT2 |

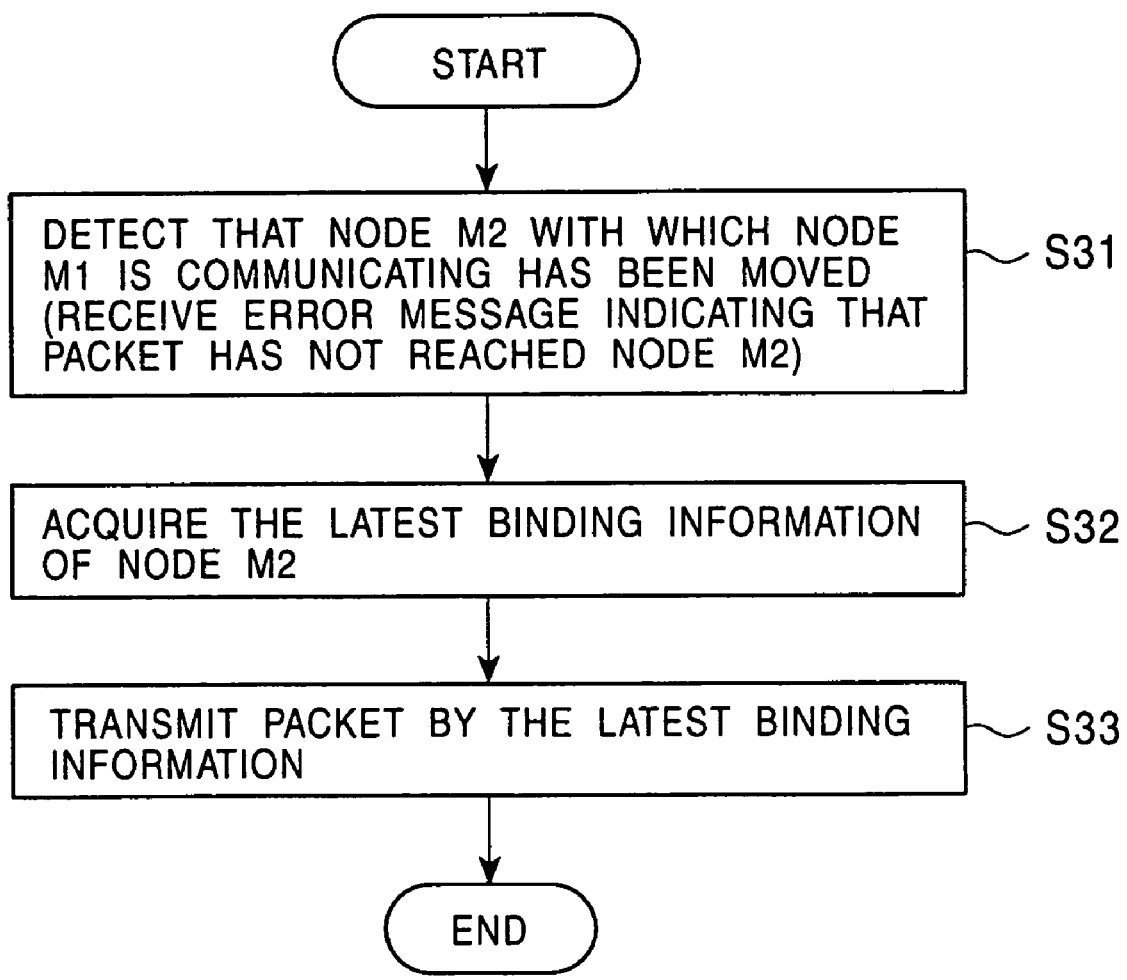

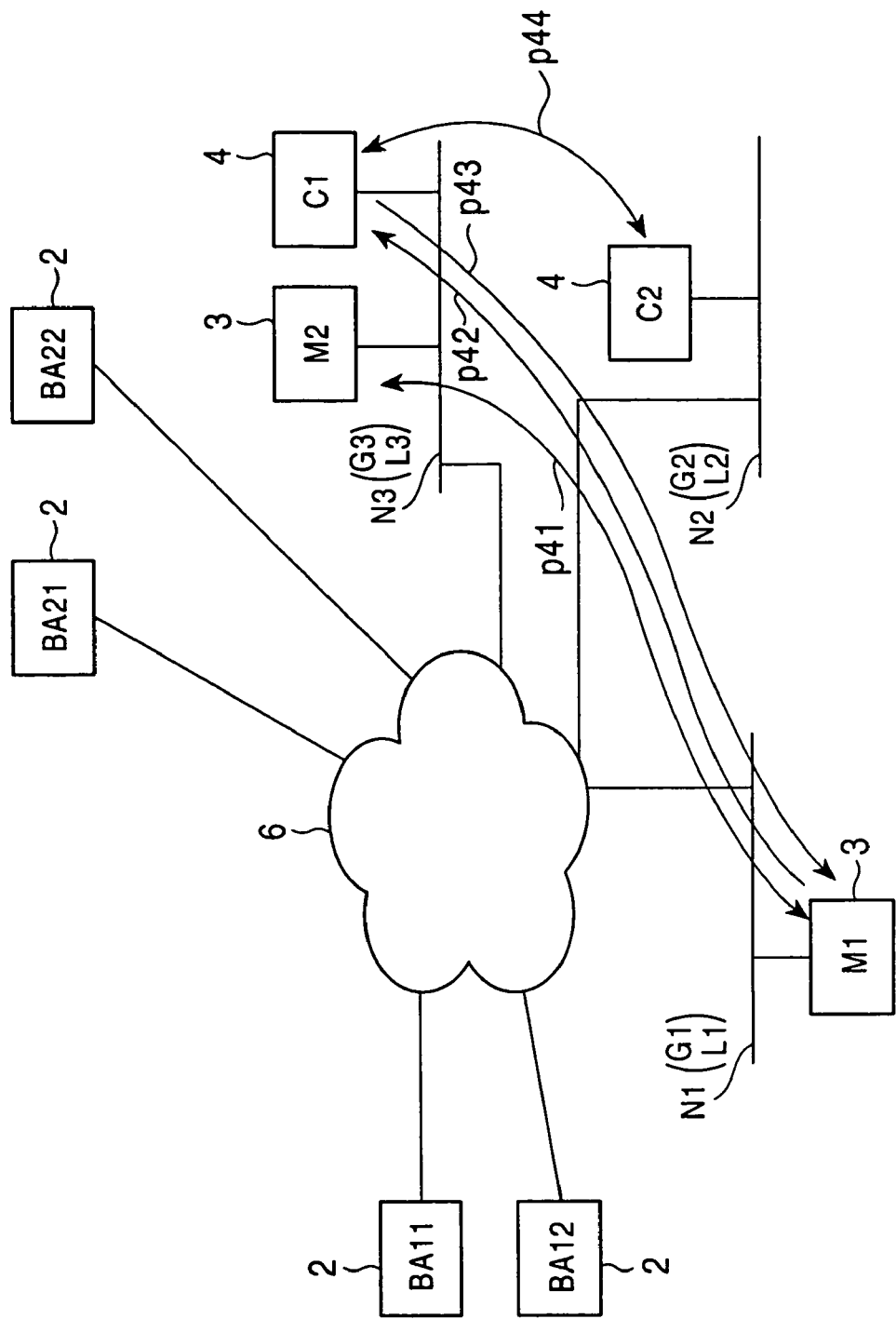

POSITION IDENTIFIER MANAGEMENT APPARATUS AND METHOD, MOBILE COMPUTER, AND POSITION IDENTIFIER PROCESSING METHOD

BACKGROUND OF THE INVENTION

1. Field of the Invention

The present invention relates to mobile computers for performing communication while moving between a plurality of interconnected networks. The invention also relates to a position identifier management apparatus and method, and a position identifier processing method for processing position identifiers concerning the above-described mobile computers.

2. Description of the Related Art

Along with the widespread use of the Internet, which is the largest worldwide computer network, users have become able to obtain publicly available information and services by connecting to the Internet, and also, new computer businesses are being developed by providing information and services to users who make access through the Internet. New technologies for the use of the Internet are also being developed. Additionally, due to a progress in the implementation techniques of computers, small and light computers are becoming popular, and it is no longer unusual for the users to carry computers with them.

In the Internet, each computer possesses an identifier, which is referred to as an Internet protocol (IP) address", and based on the IP addresses, packet switching is performed. However, IP addresses serve not only as identifiers for computers, but also as identifiers representing the positions of computers on a network (hereinafter sometimes referred to as "position identifiers"). Accordingly, when a computer is moved on a network, it is handled as different computers on the network before and after being moved, even though they are actually the same computer.

In today's world in which mobile computers have become widespread, it is inconvenient if the same computer is handled as different computers every time it is moved. For example, a system administrator is unable to conduct authentication based on IP addresses as intended, or the session used while the computer is moved is terminated.

In order to avoid such problems, the Internet Engineering Task Force (IETF), which is an IP standardizing organization, has set up a mobile IP. The mobile IP is a system in which a mobile computer is able to use the unique IP address (which is referred to as the "home address") without depending on where the computer is positioned on a network.

A mobile computer sets this home address as the source address of an IP packet. A receiver receives the packet and then sends a packet to the mobile computer by setting the home address as the destination address. With this arrangement, however, the packet will not reach the mobile computer which has been moved away from the home address. Thus, according to the mobile IP, a home agent is provided on the network which is compatible with the home address. When a packet is sent to the mobile computer which has been moved away from the home address, the home agent receives the packet for the mobile computer and transfers it to the mobile computer. The mobile computer regularly reports the current position to the home agent.

According to the above-described control, when the mobile computer moves, communication between the mobile computer and a receiver is performed in a path, which is formed in a triangle shape, via the home agent. This is redundant and lowers the transmission efficiency. In order to solve this problem, optimization of the path has been proposed in the mobile IP. In order to optimize the path, the mobile computer reports the current position thereof to the receiver, and the receiver transfers the packet addressed to the home address to the current position of the mobile computer, thereby eliminating the redundancy of the path.

However, such a mobile IP presents the following problems.

The presence of the home agent is essential, and the home agent must be positioned on the network which is compatible with the home address. This makes it difficult to ensure redundancy of the home agent because there is only one home address, and there is only one IP network which is compatible with the home address. In other words, it is possible to provide a plurality of home agents on one network, but it is impossible to provide a home agent on another network to improve redundancy. Thus, although redundancy against a failure occurring in the home agent apparatus can be ensured, redundancy against a failure occurring in the network on which the home agent is placed cannot be ensured.

The problem of the protocol overhead is also encountered. Basically, for transmitting packets to a mobile node (computer), an encapsulating technique employed on the same layer, which is referred to as the "tunneling technique", is employed. A header providing technique for controlling the path is also employed. In this technique, when transmitting a packet to a mobile node, not only the home address, but also routing header information is added to the header, thereby directly transmitting the packet to the mobile node without via the home agent. According to these techniques, the data amount of protocol header is increased, and the substantial communication performance is lowered.

Additionally, in the mobile IP of IP version 6 (IPv6), new options have been defined after products manufactured based on the fundamental standards of IPv6 were put on sale. Accordingly, new nodes implemented based on the new options may not be able to communicate with the old nodes implemented based on the old basic standards.

In short, according to the conventional mobile IP technique, the redundancy of the home agent for managing the relationship between the home address of a mobile computer and the current position thereof cannot be enhanced. Additionally, the protocol overhead is increased, and communication cannot be performed between nodes having basic IPv6 standards and new nodes having the mobile IP.

SUMMARY OF THE INVENTION

Accordingly, in view of the above background, it is an object of the present invention to provide a position identifier management apparatus for relating an identifier for uniquely specifying a mobile computer regardless of its position on a network with an identifier representing the current position of the mobile computer on the network, in which the redundancy of the management apparatus is enhanced, the protocol overhead incurred in communication for supporting the movement of the mobile computer is reduced, and communication between a computer having a mobile function and a computer without such a function is achieved, and also to provide a position identifier management method and a position identifier processing method for use in the above-described position identifier management apparatus.

In order to achieve the above object, according to one aspect of the present invention, there is provided a position identifier management apparatus for supporting the movement of a mobile computer between networks. The position identifier management apparatus includes a storage unit for storing binding information concerning the mobile computer managed by the position identifier management apparatus, the binding information including a compatible node identifier for uniquely specifying the mobile computer and a compatible position identifier for uniquely specifying a position of the mobile computer on a network. A registration unit registers the binding information in the storage unit in response to a registration request to register the binding information from another apparatus. A transmitting unit transmits the binding information in response to a query about the binding information concerning the mobile computer from another apparatus when the binding information is stored in the storage unit.

Preferably, the aforementioned position identifier management apparatus may further includes: a unit for registering binding information contained in the received registration request after detecting that a sender of the received registration request is an external mobile computer and authenticating the external mobile computer as a valid mobile computer; a unit for sending the registration request to an external position identifier management apparatus which also manages the external mobile computer when the external mobile computer is authenticated as a valid mobile computer; and a unit for registering the binding information contained in the received registration request in the storage unit after detecting that the sender of the received registration request is an external position identifier management apparatus and authenticating the external position identifier management apparatus as a valid apparatus.

Preferably, the above-described transmitting unit may transmit the binding information containing the compatible node identifier which is identical to the compatible node identifier contained in the query.

Preferably, the binding information may include a registered time and an effective period, and the position identifier management apparatus may further include a unit for erasing the binding information which has expired.

Preferably, the compatible node identifier of the mobile computer may include a first virtual network identifier assigned to the mobile computer which moves between networks and a node identifier for uniquely specifying the mobile computer, and the compatible position identifier of the mobile computer may include a second network identifier which is usable only by mobile computers assigned to a network to which the mobile computer is connected and the node identifier.

Preferably, after completion of the registration in response to the registration request from the mobile computer, the position identifier management apparatus may further include a unit for transmitting a registration response to the mobile computer.

According to another aspect of the present invention, there is provided a mobile computer which moves between networks. The mobile computer includes a first storage unit for storing binding information including a compatible node identifier and a compatible position identifier, the compatible node identifier including a first virtual network identifier assigned to the mobile computer which moves between networks and a node for uniquely specifying the mobile computer, the compatible position identifier including a second network identifier which is usable only by mobile computers assigned to a network to which the mobile computer is connected and the node identifier. A second storage unit stores binding information concerning at least one of external mobile computers with which the mobile computer is to communicate, the binding information including a compatible node identifier and a compatible position identifier, the compatible node identifier including a first virtual network identifier assigned to the external mobile computer which moves between networks and a node identifier of the external mobile computer, the compatible position identifier including a second network identifier which is usable only by mobile computers assigned to a network to which the external mobile computer is connected and the node identifier of the external mobile computer. A determining unit determines whether the binding information is to be used for a packet transmitting or receiving operation. A conversion unit performs, when the determining unit determines that the binding information is to be used, a conversion operation by converting the compatible node identifier to the compatible position identifier when the packet is to be transmitted and by converting from the compatible position identifier to the compatible node identifier when the packet is to be received.

Preferably, the above-described determining unit may determine that the conversion operation is to be performed by the conversion unit when a destination address of the packet to be transmitted is designated with the compatible node identifier.

Preferably, when the determining unit determines that the conversion operation is to be performed by the conversion unit in order to transmit the packet, the conversion unit may acquire the compatible position identifier corresponding to the compatible node identifier which designates the destination address of the packet to be transmitted, and may then convert the destination address of the packet into the acquired compatible position identifier, and may set the compatible position identifier of the mobile computer stored in the first storage unit as a source address of the packet.

Preferably, the determining unit may determine that the conversion operation is to be performed by the conversion unit when a source address and a destination address of the packet to be received are designated with the compatible position identifiers.

Preferably, when the determining unit determines that the conversion operation is to be performed by the conversion unit in order to receive the packet, the conversion unit may convert the compatible position identifier into the compatible node identifier by at least substituting the second network identifier contained in the compatible position identifier which designates the source address of the packet by the first virtual network identifier, and may also verify the integrity of the compatible node identifier which designates the source address of the packet.

Preferably, when the determination unit determines that the conversion operation by the conversion unit is not performed, it may be assumed that each of a source address and a destination address of the packet is a position identifier for uniquely specifying the position of the mobile computer on a network and containing a third network identifier which does not support the movement of the mobile computer, and the packet may be transmitted or received by using the source address and the destination address.

Preferably, the aforementioned mobile computer may further include: a movement detection unit for detecting the movement of the mobile computer by a change in a third network identifier which does not support the movement detected on a network to which the mobile computer is connected; an acquiring unit for acquiring the second network identifier when the movement of the mobile computer is detected; a generating unit for generating new binding information based on the acquired second network identifier;

and an updating unit for updating the binding information concerning the mobile computer stored in the first storage unit by the new binding information generated by the generating unit.

Preferably, the aforementioned mobile computer may further include: a first specifying unit for specifying a position identifier management apparatus which manages the mobile computer from position identifier management apparatuses, disposed on a network, for storing the binding information which is requested to be registered by mobile computers managed by the position identifier management apparatuses and for responding to a query about the binding information; and a registration request sending unit for sending the new binding information concerning the mobile computer generated by the generating unit to the position identifier management apparatus specified by the first specifying unit.

Preferably, the above-described mobile computer may further include: a second specifying unit for specifying a position identifier management apparatus which manages an external mobile computer with which the mobile computer is to communicate, from position identifier management apparatuses, disposed on a network, for storing the binding information which is requested to be registered by mobile computers managed by the position identifier management apparatuses, and for responding to a query about the binding information; a query sending unit for sending, when the second storage unit does not store effective binding information about the external mobile computer, a query about the binding information concerning the external mobile computer containing the compatible node identifier to the position identifier management apparatus specified by the second specifying unit; a response receiving unit for receiving a response to the query from the position identifier management apparatus specified the second specifying unit; and a registration unit for registering the binding information concerning the external mobile computer contained in the received response in the second storage unit.

Preferably, the binding information may include a registered time and an effective period, and the mobile computer may further include a unit for erasing the binding information which has expired.

According to still another aspect of the present invention, there is provided a position identifier management method including the steps of: storing by a mobile computer latest binding information including a compatible node identifier and a compatible position identifier in a storage unit of the mobile computer when the movement of the mobile computer is detected, the compatible node identifier containing a first virtual network identifier assigned to the mobile computer which moves between networks and a node identifier for uniquely specifying the mobile network, the compatible position identifier containing a second network identifier which is usable only by mobile computers assigned to a network to which the mobile computer is moved and the node identifier; specifying by the mobile computer at least one position identifier management apparatus which manages the mobile computer from position identifier management apparatuses, disposed on a network, for storing the binding information which is requested to be registered from an external mobile computer managed by the position identifier management apparatuses, and for responding to a query about the binding information; sending a registration request to register the latest binding information about the mobile computer from the mobile computer to one of the specified position identifier management apparatuses; storing the binding information contained in the registration request in the storage unit of the position identifier management apparatus which has received the registration request after the position identifier management apparatus detects that the sender of the registration request is the mobile computer and authenticates the mobile computer as a valid mobile computer; and sending the registration request to an external position identifier management apparatus which also manages the mobile computer after the mobile computer which has sent the registration request is authenticated as a valid mobile computer.

Preferably, in the position identifier management method, the mobile computer may send a query containing the position node identifier of the mobile computer to a server for storing a relationship between the compatible node identifier and an address of a position identifier management apparatus which manages the mobile computer provided with the compatible node identifier, and may receive a response to the query from the server, thereby specifying the position identifier management apparatus which manages the mobile computer.

According to a further aspect of the present invention, there is provided a position identifier processing method for a mobile computer, including the steps of: storing binding information including a compatible node identifier and a compatible position identifier in a storage unit of the mobile computer, the compatible node identifier containing a first virtual network identifier assigned to the mobile computer which moves between networks and a node identifier for uniquely specifying the mobile computer, the compatible position identifier containing a second network identifier which is usable only by mobile computers assigned to a network to which the mobile computer is connected and the node identifier; acquiring, when a destination address of a packet to be transmitted is designated with the compatible node identifier and when the storage unit does not store the compatible node identifier, the binding information containing the compatible node identifier by making a query to a position identifier management apparatus which manages the binding information concerning a mobile computer provided with the compatible node identifier; and converting the compatible node identifier representing the destination address of the packet to be transmitted into the acquired compatible position identifier, and setting the compatible position identifier of the mobile computer stored in the storage unit as the source address of the packet.

Preferably, in the aforementioned position identifier processing method, when an error message indicating that the packet has not reached is returned after sending the packet having the compatible position identifiers as the source address and the destination address, a query may be made to the position identifier management apparatus which manages the binding information concerning the mobile node provided with the compatible node identifier corresponding to the compatible position identifier so as to acquire the latest binding information concerning the mobile computer provided with the compatible node identifier, and then, the packet may be re-transmitted.

According to a yet further aspect of the present invention, there is provided a position identifier processing method for a mobile computer, including the steps of: storing binding information including a compatible node identifier and a compatible position identifier in a storage unit of the mobile computer, the compatible node identifier containing a first virtual network identifier assigned to the mobile computer which moves between networks and a node identifier for uniquely specifying the mobile computer, the compatible position identifier containing a second network identifier which is usable only by mobile computers assigned to a network to which the mobile computer is connected and the node identifier; and converting, when each of a source address and a destination address of a received packet is designated with the compatible position identifier, the compatible position identifier into the compatible node identifier by at least substituting the second network identifier of the compatible position identifier which designates the source address of the packet by the first network identifier, and also verifying the integrity of the compatible node identifier which designates the source address of the packet.

The above-described apparatus may be accomplished by the above-described method, and vice versa.

The above-described apparatus and method may be implemented by a computer-readable recording medium for storing a program which causes a computer to execute the process corresponding to the present invention (or which causes a computer to function as the process corresponding to the present invention, or causes a computer to implement the functions corresponding to the present invention).

According to the present invention, instead of using the concept of a home network, which is employed in the conventional mobile IP, the position identifier management apparatus is provided for identifying a relationship between the compatible node identifier which uniquely specifies a mobile computer and a compatible position identifier which uniquely specifies the position of the mobile computer on a network. Accordingly, binding information concerning a mobile computer to be communicated can be acquired from the position identifier management apparatus, and packets can be transmitted and received while automatically performing conversion between a compatible node identifier and a compatible position identifier. It is thus possible to enhance redundancy of the position identifier management apparatus. Additionally, the need for using the encapsulating technique can be eliminated, thereby making it possible to reduce the protocol overhead while the communication which supports the movement of the mobile computer between networks by using a compatible node identifier/ compatible position identifier is performed. A mobile computer is able to perform both the communication which does not support the movement by using a regular position identifier and the communication which supports the movement by using the compatible node identifier/compatible position identifier, thereby enabling communication between a computer with a compatible node identifier/ compatible position identifier and a computer without a compatible node identifier/compatible position identifier.

BRIEF DESCRIPTION OF THE DRAWINGS

FIG. 2 illustrates an example of binding information;

FIG. 3 illustrates an example of binding information;

FIG. 11 is a flow chart illustrating an example of the processing for detecting the movement of a mobile node by another mobile node while communication is being performed between the two nodes; and FIG. 12 illustrates the operation performed by the embodiment shown in FIG. 1.

DETAILED DESCRIPTION OF THE INVENTION

The present invention is described in detail below with reference to the drawings through illustration of a preferred embodiment.

In the following embodiment, an IPv6 network is applied to the present invention.

Figure 1:
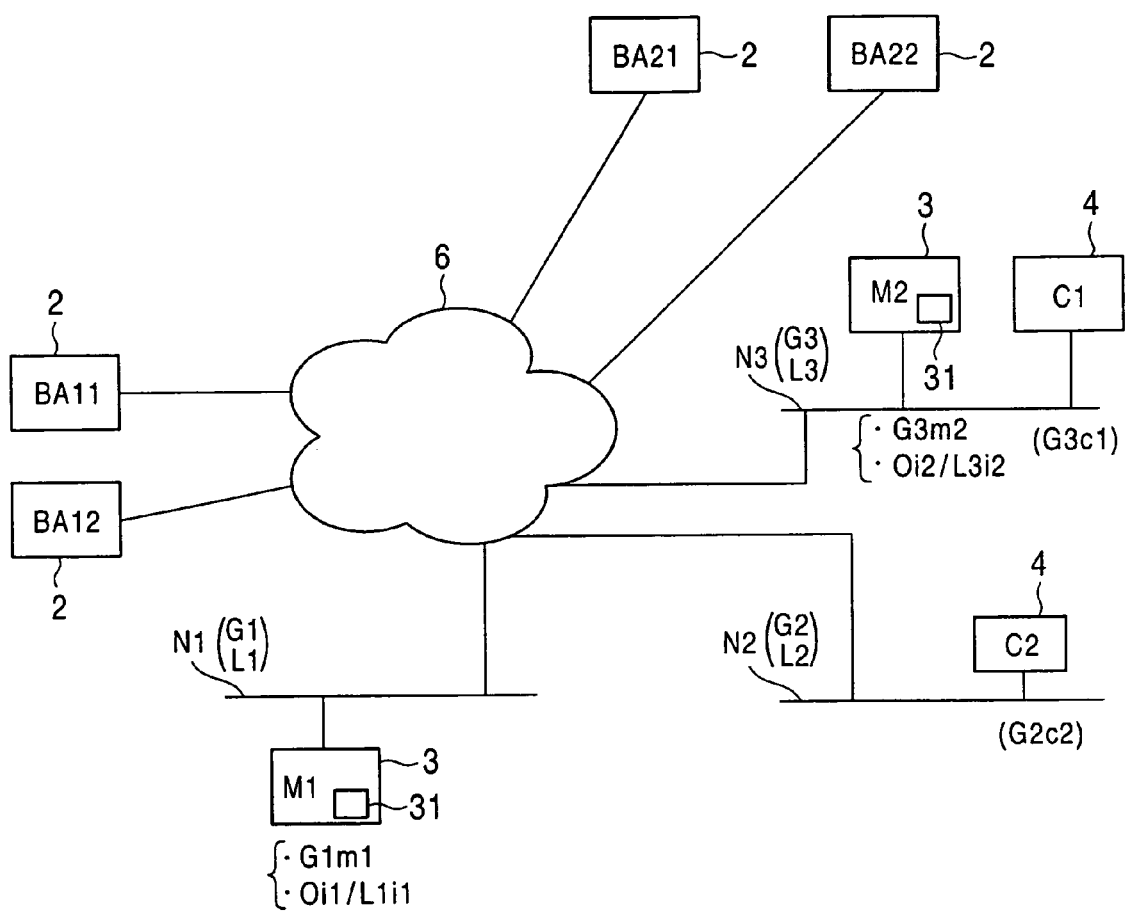
FIG. 1 illustrates an example of the configuration of a network according to an embodiment of the present invention.

FIG. 1 illustrates an example of the configuration of a network according to an embodiment of the present invention. In FIG. 1, N1 through N3 indicate sub-networks, and a network 6, for example, the Internet according to IPv6, connects the sub-networks N1 through N3 to each other. The number of sub-networks is not restricted to three, and the sub-networks may be configured in a hierarchical structure. A description of router devices and various server devices disposed in the sub-networks is omitted. In the subsequent description, a "node" is a computer.

A computer 3 is able to perform two types of communications, such as a first communication performed according to a position identifier, such as a regular network layer address in IPv6 (IP address) (hereinafter referred to as the "regular position identifier"), which represents the position of a computer on a network and which does not support the movement of the computer between networks, and a second communication performed according to a compatible node identifier/a compatible position identifier, which are discussed in detail below. For example, in a computer M1 in FIG. 1, G1m1 is a regular position identifier, while Oi1 and L1i1 are a compatible node identifier and a compatible position identifier, respectively.

In a computer which is able to perform the second communication, a certain unique IP address (i.e., compatible node identifier) is never changed even if the position identifier is changed by moving between networks. Accordingly, such a computer is hereinafter referred to as a "mobile node".

On the other hand, a computer 4 is able to perform the first communication according to the regular position identifier (for example, G3c1 of a computer C1 shown in FIG. 1). However, unlike the computer (mobile node) 3, the computer 4 is not able to perform the second communication according to the compatible node identifier/compatible position identifier. Since the computer 4 cannot move between networks by communication, it is hereinafter referred to as a "fixed node".

In this embodiment, the second communication (mobile communication) is achieved only between mobile nodes, while the first communication (non-mobile communication) is achieved between a mobile node and a fixed node, between fixed nodes, and between mobile nodes.

In the first communication, the regular position identifier is used for identifying both the node and the position of the node on the network. Accordingly, the movement of the node is not supported. Conversely, in the second communication, the node is identified by the compatible node identifier, while the position of the node on the network is identified by the compatible position identifier. Accordingly, the movement of the node is supported. In this embodiment, therefore, a mechanism is provided for solving the problem inherent in the current compatible position identifier by using the compatible node identifier of the mobile node 3. The relationship between the current compatible position identifier and the compatible node identifier is referred to as "binding". Information concerning the compatible position identifier, the compatible node identifier, and additional information concerning the mobile node is hereinafter referred to as "binding information". In this embodiment, the additional information contains at least a registered time and an effective period of the binding.

For supporting the second communication, i.e., the movement of mobile nodes, a position identifier management apparatus (hereinafter referred to as the "binding server") 2 manages and stores the binding information of the mobile nodes 3 which are under the control of the binding server 2, and provides search services concerning the binding information (in particular, solving the problem of the compatible position identifier by using the compatible node identifier). The same mobile node can be managed by a plurality of binding servers 2.

For implementing the second communication in addition to the first communication, a position identifier processing apparatus 31 is added to an IP processing apparatus of the mobile node 3. That is, the position identifier processing apparatus 31 is extended from an IP processing apparatus, which processes IP packets by using the regular position identifier provided for a fixed node, by adding a position identifier processing function. The basic functions of the position identifier processing apparatus 31 are as follows.

The position identifier processing apparatus 31 determines whether a current communication is the first communication according to the regular position identifier or the second communication according to the compatible position identifier/compatible node identifier.

If the second communication is being made, the compatible node identifier and the compatible position identifier are converted so that compatible node identifier is used on an upper layer, such as an application on the node, and the compatible position identifier is used in performing packet transfer on the network.

Accordingly, as will be discussed in detail below, the position identifier processing apparatus 31 processes the position identifiers, such as managing and storing binding information concerning the mobile node 3 and a receiver node, and registering the binding information and making a query about the binding information to the binding server 2, and converting between the compatible node identifier and the compatible position identifier when sending and receiving packets.

A description is now given of the individual identifiers used in this embodiment (in particular, relationships and differences among the regular position identifier, the compatible node identifier, and the compatible position identifier).

(Lower Bits of Network Layer Address)

An identifier assigned uniquely in the world to each node is referred to as a "node identifier" (for example, "i1" assigned to node M1 in FIG. 1).

In contrast, an identifier assigned uniquely in the world to each communication interface loaded in a node is referred to as an "interface identifier" (for example, "m1" assigned to node M1 in FIG. 1). The interface identifier has, for example, 64 bits.

The above-described node identifier and the interface identifier are used for lower bits of the network layer address, and each identifier has, for example, 64 bits.

(Upper Bits of Network Layer Address)

A network prefix is referred to as a "network identifier". In this embodiment, the network identifiers include not only a network identifier, which forms a regular position identifier, (for example, "G1" assigned to the sub-network N1 in FIG. 1), but also a mobile guaranteed real network identifier (for example, "L1" assigned to the sub-network N1 in FIG. 1) and a mobile guaranteed general network identifier (for example, "O", which is determined for all the mobile nodes). These identifiers are used for upper bits of the network address layer, and each identifier has, for example, 64 bits.

(Identifier Having a Format of the Network Layer Address)

In this embodiment, identifiers having a format of the network layer address include a regular position identifier, a compatible position identifier, and a compatible node identifier. Such an identifier has, for example, 128 bits. Details of the individual identifiers are as follows.

The regular position identifier is assigned to each sub-network. The regular position identifier (for example, "G1m1" assigned to node M1 in FIG. 1) is formed by interconnecting a network identifier used in the first communication (hereinafter referred to as a "regular network identifier") and an interface identifier.

The compatible position identifier is assigned to each sub-network, as in the regular position identifier, and the network identifier used in the second communication by the mobile node 3 is referred to as a "mobile guaranteed real network identifier". The compatible position identifier (for example, "L1i1" assigned to node M in FIG. 1) is formed by interconnecting the mobile guaranteed real network identifier and the node identifier. The compatible position identifier becomes valid as the network address format, and is unique on the network.

A virtual network prefix assigned to mobile nodes is referred to as a "mobile guaranteed general network identifier". The compatible node identifier (for example, "Oi1" assigned to node M1 in FIG. 1) is formed by interconnecting the mobile guaranteed general network identifier and the node identifier. The compatible node identifier becomes valid as the network address format, and is unique on the network.

The network layer address employed in this embodiment can be determined whether it is a regular position identifier, a compatible node identifier, or a compatible position identifier by the value of the network identifier contained in the network layer address. That is, the space of the network identifier has been defined so that the network identifier of each node is a regular network identifier, a mobile guaranteed general network identifier, or a mobile guaranteed real network identifier by referring to the value of the network identifier.

In this embodiment, only the single mobile guaranteed general network identifier is determined (namely, all the mobile nodes have the same mobile guaranteed general network identifier). However, a plurality of mobile guaranteed general network identifier may be provided, in which case, they may be used as required, and it is also possible to execute further control by the values of the mobile guaranteed general network identifiers. For example, the value of a mobile guaranteed general network identifier may indicate the version of the corresponding mobile node so as to perform different types of processing.

Details of the individual identifiers used in the example of the network shown in FIG. 1 are given below.

The following values are already predetermined.

The mobile guaranteed general network identifier has a predetermined value O (64 bits). The regular network identifier G1 (64 bits) and the mobile guaranteed real network identifier L1 (64 bits) are assigned to the sub-network N1. The regular network identifier G2 (64 bits) and the mobile guaranteed real network identifier L2 are assigned to the sub-network N2. The regular network identifier G3 and the mobile guaranteed real network identifier L3 are assigned to the sub-network N3.

The mobile node M1 has the node identifier i1 (64 bits) and the interface identifier m1 (64 bits). The compatible node identifier of the mobile node M1 is "Oi1" (128 bits), which is fixed regardless of to which network the mobile node M1 is connected. When being connected to the sub-network N1, the mobile node M1 acquires the regular network identifier G1 and the mobile guaranteed real network identifier L1. In this case, the current regular position identifier of the mobile node M1 is G1m1 (128 bits), while the current compatible position identifier thereof is L1i1 (128 bits).

It is now assumed that an IPv6 network is used in this embodiment. When m1 is 0000:39ff:fe00:0001 (64 bits), i1 is 1000:a000:b000:c000 (64 bits), G1 is 3ffe:0501:1000:2000 (64 bits), and O is fe00:0000:0000:0000 (64 bits), the current position identifier (G1m1) of the mobile node is 3ffe:0501:1000:2000:0000:39ff:fe00:0001, and the current compatible position identifier (Oi1) thereof is fe00:0000:0000:0000:1000:a000:b000:c000.

One example of the binding information when the values of the identifiers of the mobile node M1 are set as above is shown in FIG. 2.

As in the case of the mobile node M1, a mobile node M2 has a node identifier i2 (64 bits) and an interface identifier m2 (64 bits). The compatible node identifier of the mobile node M2 is Oi2 (128 bits).

When being connected to the sub-network N3, the mobile node M2 acquires the regular network identifier G3 and the mobile guaranteed real network identifier L3. In this case, the current regular position identifier of the mobile node M2 is G3m2 (128 bits) and the current compatible position identifier thereof is L3i2 (128 bits).

One example of the binding information when the values of the identifiers of the mobile node M2 are set above is shown in FIG. 3.

A fixed node C1 has an interface identifier c1 (64 bits). When connected to the sub-network N3, the fixed node C1 acquires the regular network identifier G3, in which case, the regular position identifier of the fixed node C1 is G3c1 (128 bits).

Likewise, a fixed node C2 has an interface identifier c2 (64 bits). When connected to the sub-network N2, the fixed node c2 acquires the regular network identifier G2, in which case, the regular position identifier of the fixed node c2 is G2c2 (128 bits).

As discussed above, a mobile node possesses therein a mobile guaranteed general network identifier, a node identifier, and an interface identifier. When being connected to a network, the mobile node is able to acquire a mobile guaranteed real network identifier and a regular network identifier, and to use a compatible node identifier/compatible position identifier and a regular position identifier.

On the other hand, a fixed node possesses therein an interface identifier, and when being connected to a network, it is able to acquire a regular network identifier and to use a regular position identifier.

A description is now given of the configuration and operation of the position identifier processing apparatus loaded in each of the binding server and the mobile node.

Figure 4:
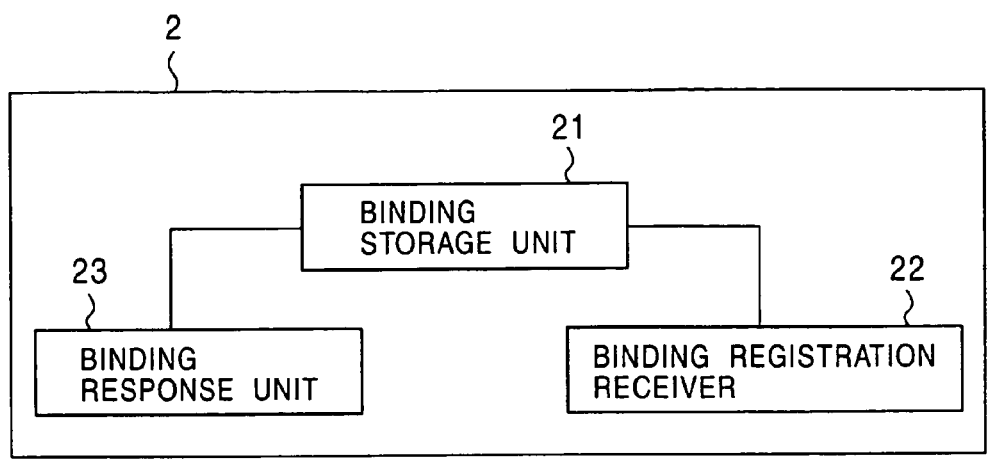
FIG. 4 is a block diagram illustrating an example of a position identifier management apparatus shown in FIG. 1.

FIG. 4 illustrates an example of the configuration of the binding server 2. The binding server 2 includes, as shown in FIG. 4, a binding storage unit 21, a binding registration receiver 22, and a binding response unit 23.

The binding storage unit 21 stores the binding information (see FIGS. 2 and 3) including the compatible node identifier, the current compatible position identifier, and additional information (in this example, the registered time and the effective period) concerning the mobile nodes under the control of the binding server 2.

The binding registration receiver 22 receives a registration request concerning the binding from a mobile node.

The binding response unit 23 responds to a query about the binding of a certain mobile node.

The mobile node 3 is provided, as shown in FIG. 1, with the position identifier processing apparatus 31. Obviously, the mobile node 3 is provided with other devices required for performing data communication via a network, such as an input/output device, a communication interface, various control software and application software. Such devices are, however, well known, and an explanation thereof will thus be omitted.

Figure 5:
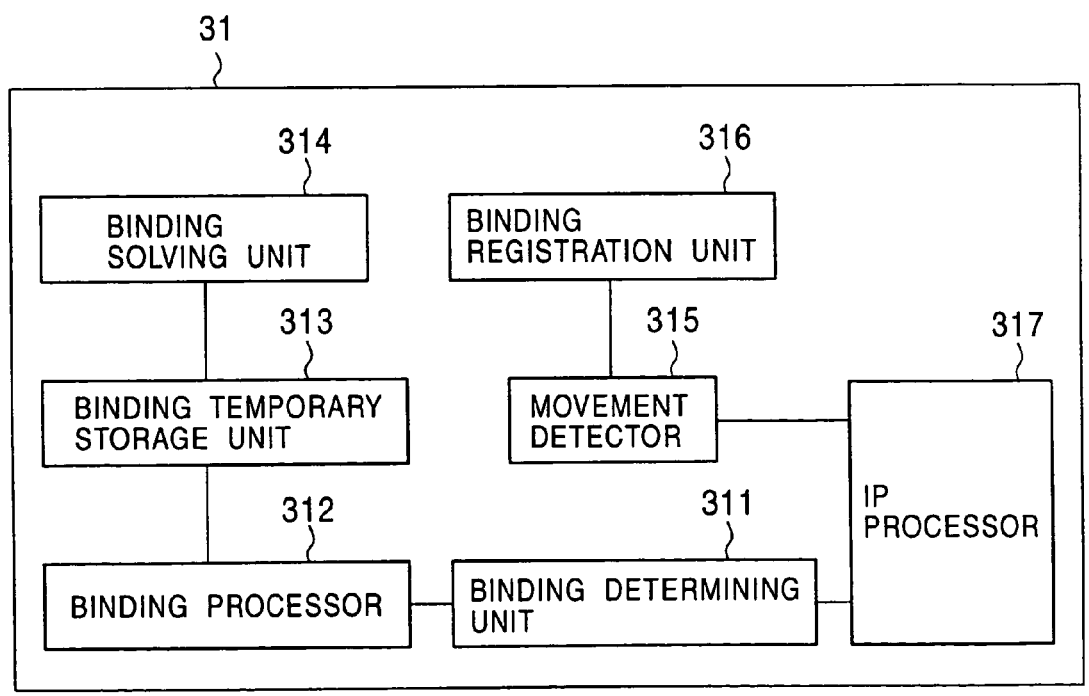
FIG. 5 is a block diagram illustrating an example of a position identifier processing apparatus loaded in a mobile computer shown in FIG. 1.

FIG. 5 illustrates an example of the configuration of the position identifier processing apparatus 31 of the mobile node 3.

The position identifier processing apparatus 31 is formed of, as shown in FIG. 5, a binding determining unit 311, a binding processor 312, a binding temporary storage unit 313, a binding solving unit 314, a movement detector 315, a binding registration unit 316, an IP processor 317.

The binding determining unit 311 determines whether the binding information is to be used, based on the source address (which is designated with the network layer address of a sender node) of a packet and the destination address (which is designated with the network layer address of a final destination node) of the packet. This determination is made based on, for example, the sending and receiving addresses, and more specifically, by referring to the network identifiers (for example, G1 through G3, L1 through L3, and O) contained in the addresses.

The binding processor 312 converts the compatible node identifier (for example, Oi2) which is used in an upper layer, for example, an application, and the compatible position identifier (for example, L3i2) which is used in performing packet transfer in a network.

The binding temporary storage unit 313 manages the binding information (see FIGS. 2 and 3) of the mobile node 3 and the other nodes. The binding temporary storage unit 313 has a cache function of storing the binding information (which is the function of storing a plurality of items of binding information concerning the node to which the mobile node 3 is currently communicating, and the nodes to which the mobile node 3 communicated in the past). If the binding temporary storage unit 313 does not have required binding information, it is able to request the binding solving unit 314 to solve the problem of binding.

The binding solving unit 314 queries the binding server 2 as to the binding information of a node to which the mobile node 3 is currently communicating or is to communicate according to the second communication, and reports the result to the binding temporary storage unit 313.

The movement detector 315 detects that the mobile node 3 has been moved between networks, and reports the compatible position identifier representing the current position on the network to the binding registration unit 316.

Based on the information reported from the movement detector 315, the binding registration unit 316 reports the current binding information to the binding server 2 and registers it in the binding temporary storage unit 313.

The IP processor 317 executes processing concerning the network layer.

The functions of the individual components of the binding server 2 shown in FIG. 4 are discussed in detail below.

The binding registration receiver 22 receives a binding registration request from a mobile node. The received request is reported to the binding storage unit 21. After completion of the registration in the binding storage unit 21, the binding registration receiver 22 reports a registration response message representing the completion of the registration to the mobile node which has requested the registration.

The binding response unit 23 receives a query request concerning the binding information (for example, Oi1, L1i1, T1, LT1) of a certain compatible node identifier (for example, Oi1), and makes a query about it to the binding storage unit 21. Then, the binding response unit 23 receives a response from the binding storage unit 21 and reports it to the node which has queried about the binding information.

The binding storage unit 21 stores the binding information (in this example, the compatible node identifier, the compatible position identifier, and the registered time, and the effective period) of the mobile nodes which are under the control of the binding server 2. The binding storage unit 21 receives such binding information from the binding registration receiver 22.

When receiving a registration request from the binding registration receiver 22, the binding storage unit 21 determines whether the source node is a mobile node. If so, the binding storage unit 21 further determines whether the mobile node is a valid node, and if the mobile node is authenticated, the binding storage unit 21 registers the received binding information (new registration or updating). In this case, the binding storage unit 21 further checks for a mobile node which has sent a registration request and which is under the control of not only the binding server 2 but also another binding server. This can be checked by referring to the compatible node identifier of the mobile node and by making a query to the binding server 2 or a predetermined server about whether such a server is present, and if so, about the address of the binding server. If the presence of such a binding server is determined, a binding registration request similar to that sent to the binding server 2 is sent to the corresponding binding server.

If a binding registration request has been sent from another binding server, the binding storage unit 21 first authenticates the binding server and then registers the received binding information (new registration or updating).

In response to a query from the binding response unit 23, the binding storage unit 21 reports the binding information of the requested compatible node identifier.

Additionally, the binding storage unit 21 erases the binding information which has expired.

For example, it is now assumed in FIG. 1 that binding servers B11 and B12 are assigned to the mobile node M1 and binding servers B21 and B22 are assigned to the mobile node M2, and that the mobile node M1 sends a binding registration request to one of the binding servers B11 and B12 (for example, B11). Then, the binding server B11 stores the binding information (see FIG. 2) of the mobile node M1 and also sends the same information to the binding server B12. This enables the binding server B12 to retain the binding information of the mobile node M1. By making a query to one of the binding servers B11 and B12, a mobile computer is able to acquire the binding information of the mobile node M1 having the compatible node identifier Oi1. The same applies to the relationship between binding servers B21 and B22 and the mobile node M2.

A detailed description is now given of the functions of the individual components of the position identifier processing apparatus 31 of the mobile node 3 shown in FIG. 5.

The operation of the IP processor 317 is briefly given below. In sending and receiving packets, the IP processor 317 generates an IP packet based on transfer data and the destination address received from an upper layer, and then delivers it to the datalink layer (after being subjected to certain processing in the datalink layer, the packet is sent to a network). In receiving packets, after a packet transferred via a network has been subjected to certain processing in the datalink layer, the IP processor 317 extracts the data and the source address from the IP packet received from the datalink layer, and delivers it to an upper layer.

That is, in this embodiment, (a-1) in transmitting a packet, if the regular position identifier is specified as the destination address by an upper layer, such as the application, the packet is transmitted by using the regular position identifier;

(a-2) in transmitting a packet, if the compatible node identifier is specified as the destination address by an upper layer, such as the application, the packet is transmitted by using the compatible position identifier;

(b-1) in receiving a packet, if the regular position identifiers are designated as the source and destination addresses, they are delivered, together with the data contained in the packet, to an upper layer, such as the application; and (b-2) in receiving a packet, if the compatible position identifiers are designated as the source and destination addresses, the compatible node identifiers are delivered, together with the data contained in the packet, to an upper layer, such as the application.

For writing the source address into a packet to be transmitted, the following technique may generally be employed. When the destination address is specified by the application, a node queries the IP processor about an appropriate source address in order to select it from the addresses possessed by the node. More specifically, by referring to a path table, an address which matches the conditions is selected from the addresses provided for interfaces through which a packet is to be transmitted, or if such an address cannot be detected, all the addresses possessed by the node are searched. In this case, if the destination address specified by the application indicates a compatible node identifier, the compatible node identifier of the node is also designated as the source address. If not, a regular position identifier is specified as the source address. Thereafter, both the source and destination addresses are specified from an upper layer to the IP layer.

In this embodiment, for writing the source address into a packet to be transmitted, the following techniques may be considered.

(1) In the IP processor 317, the destination address received from an upper layer is written into a packet to be transmitted, and without writing the source address, the binding determining unit 311 is operated (as a result, if the destination address is a compatible node identifier, it is overwritten by a compatible position identifier by the binding processor 312). If the IP processor 317 receives a message from the binding determining unit 311 that the destination address is a compatible position identifier, it writes a compatible position identifier into the source address. Conversely, if the destination address is found to be a regular position identifier, the IP processor 317 writes a regular position identifier into the source address.

(2) In the IP processor 317, the destination address received from an upper layer is written into a packet to be transmitted, and a regular identifier is temporarily written into the packet as the source address. Then, the binding determining unit 311 is operated (as a result, if the destination address is a compatible node identifier, it is overwritten by the compatible position identifier by the binding processor 312). If the IP processor 317 receives a message from the binding determining unit 311 that the destination address is a compatible position identifier, the IP processor 317 overwrites the previously written regular position identifier by a compatible position identifier as the source address into the packet to be transmitted.

(3) In the above-mentioned technique (2), a compatible position identifier is temporarily written as the source address.

(4) In the IP processor 317, the destination address received from an upper layer is written into a packet to be transmitted, and a regular position identifier is temporarily written as the source address. Then, the binding determining unit 311 is operated. As a result, if the destination address is a compatible node identifier, the binding processor 312 is activated. The source and destination addresses are overwritten by compatible position identifiers by the binding processor 312, and the packet having the compatible position identifiers as the source and destination addresses is returned to the IP processor 311.

In this embodiment, techniques (1) and (4) are employed by way of example.

In receiving packets, before executing the processing by the IP processor 317, or upon completion of the predetermined processing by the IP processor 317, the source and destination addresses of a packet to be received which are compatible position identifiers are converted into compatible node identifiers. In this case, only the source address may be converted into a compatible node identifier. Alternatively, after completing the whole processing by the IP processor 317, the compatible position identifiers may be converted into compatible node identifiers before the packet is sent to an upper layer.

In transmitting a packet, the binding determining unit 311 checks the address format of the destination address of a packet to be transmitted by the IP processor 317, and if the address format of the destination address is a compatible node identifier, the packet is delivered to the binding processor 312. According to the above-described technique (1), after the destination address which is a compatible node identifier is converted into a compatible position identifier by the binding processor 312, the binding determining unit 311 reports to the IP processor 317 that the destination address was a compatible node identifier, and also returns the resulting packet to the IP processor 317. On the other hand, according to the above-described technique (4), the destination address which is a compatible node identifier is converted into a compatible position identifier by the binding processor 312, and also, the compatible position identifier of the node 3 (in this case, mobile node M1) is written as the source address. The binding determining unit 311 then returns the resulting packet to the IP processor 317, as will be discussed below.

If the binding determining unit 311 receives a message from the binding processor 312 that there is no corresponding binding information, the processing of the IP processor 317 is interrupted.

If the address format of the destination address is found to be a regular position identifier, the binding processor 312 is not activated. According to the aforementioned technique (1), the binding determining unit 311 directly returns the packet to the IP processor 317, and reports to the IP processor 317 that the destination address is a regular position identifier. According to the aforementioned technique (4), the packet is returned to the IP processor 317.

In receiving packets, the binding determining unit 311 checks the address format of the source and destination addresses of the received packet. If the source and destination addresses are found to be compatible position identifiers, the binding determining unit 311 delivers the packet to the binding processor 312. The binding processor 312 then converts the compatible position identifiers into compatible node identifiers, and delivers the resulting packet to the IP processor 317.

If the address format of the source and destination addresses is found to be the regular position identifier, the binding determining unit 311 directly delivers the packet to the IP processor 317.

As will be discussed below, upon receiving a message from the binding processor 312 indicating that the compatible node identifier is not valid, the binding determining unit 311 interrupts processing of the IP processor 317.

In sending and receiving packets between the IP processor 317 and the binding determining unit 311, instead of transferring data, a pointer indicating the storage location of a packet may be delivered. If there is no change in the storage location of the packet, the pointer is merely delivered from the IP processor 317 to the binding determining unit 311, and only required messages are sent from the binding determining unit 311 to the IP processor 317. The same applies to data transfer between other units, such as between the binding processor 312 and the binding determining unit 311.

Upon receiving the packet to be transmitted from the binding determining unit 311, the binding processor 312 extracts the compatible node identifier from the destination address of the packet, and queries the binding temporary storage unit 313 about the binding information by using the compatible node identifier as a key. According to the above-described technique (1), after acquiring the binding information from the binding temporary storage unit 313, the binding processor 312 converts the destination address of the packet from the compatible node identifier (for example, Oi2) to the compatible position identifier (for example, L3i2). The binding processor 312 then returns the resulting packet to the binding determining unit 311. In contrast, according to the above-described technique (4), after acquiring the binding information from the binding temporary storage unit 313, the binding processor 312 changes the destination address of the packet into the compatible position identifier, and also changes the source address of the packet into the compatible position identifier of the mobile node M1. The binding processor 312 then returns the resulting packet to the binding determining unit 311.

If the corresponding binding information cannot be obtained from the binding temporary storage unit 313, the binding processor 312 reports the information to the binding determining unit 311.

The received packet is delivered from the binding determining unit 311 to the binding processor 312. The binding processor 312 extracts the compatible position identifier (for example, L3i2) from the source address of the packet, and substitutes the mobile guaranteed real network identifier (for example, L3) of the compatible position identifier with the mobile guaranteed general network identifier (for example, O), thereby converting the source address into the compatible node identifier (for example, Oi2). The binding processor 312 also changes the destination address into the compatible node identifier of the mobile node M1.

Additionally, the binding processor 312 determines whether the compatible node identifier obtained from the compatible position identifier of the source address of the packet is valid. If so, the binding processor 312 returns the packet to the binding determining unit 311 and allows it to continue the receiving processing. If the compatible node identifier is found to be invalid, the binding processor 312 sends the corresponding information to the binding determining unit 311.

As discussed above, the binding temporary storage unit 313 stores a single or a plurality of items of binding information, and also erases the binding information which has expired. In response to a request from the binding processor 312, the binding temporary storage unit 313 returns the binding information of the requested compatible node identifier.

If there is no binding information of the requested compatible node identifier, the binding temporary storage unit 313 requests the binding solving unit 314 to acquire the required binding information from the binding server 2.

If the required binding information cannot be acquired from the binding server 2, the binding temporary storage unit 313 sends the corresponding message to the binding processor 312.

When being requested from the binding temporary storage unit 313 to search for the binding information, the binding solving unit 314 searches for an appropriate binding server from the designated compatible node identifier, and requests the binding server to send the binding information (if more than one binding servers are searched, the suitable binding server is selected). For example, in the example shown in FIG. 1, when obtaining the binding information of the mobile node M2 with which the mobile node M1 is to communicate, the mobile node M1 queries one of the binding servers B11 and B12, which are assigned to the mobile node M2, about the binding information.

If the required information is obtained from the binding server 2, it is stored in the binding temporary storage unit 313. If not, the binding solving unit 314 sends the corresponding message to the binding temporary storage unit 313.

The movement detector 315 stores, for example, the regular network identifier acquired in the sub-network to which the mobile node M1 was last connected, and compares a newly acquired regular network identifier (this operation is performed even if no regular network identifier is stored because the mobile node M1 has never been connected before). If the previous regular network identifier does not coincide with the new regular network identifier, the movement detector 315 determines that the mobile node M1 has been moved between networks. For example, when the mobile node M1 has been moved from the sub-network N2 to the sub-network N1, the regular network identifier is changed from G2 to G1. The movement detector 315 then detects inconsistencies of the regular network identifiers, thereby recognizing that the mobile node M1 has been moved between the networks.

Then, the movement detector 315 detects the mobile guaranteed real network identifier used in the network to which the node M1 has been moved. For example, in the example shown in FIG. 1, the mobile guaranteed real network identifier L1 is detected.

Subsequently, the movement detector 315 generates the compatible position identifier (for example, L1i1) from the detected mobile guaranteed real network identifier (for example, L1) and the node identifier (for example, i1) of the mobile node M1. It should be noted that the compatible node identifier (for example, Oi1) consisting of the mobile guaranteed general network identifier and the node identifier is fixed.

The movement detector 315 reports the generated compatible position identifier to the binding registration unit 316. The movement detector 315 also reports to the IP processor 317 as required that the generated compatible position identifier should also be used as a position identifier of the mobile node M1.

The binding registration unit 316 searches for a group of binding servers which are suitable for the mobile node M1, and temporarily stores a position (network layer address) of one or a plurality of detected binding servers. This operation is performed regularly.

The binding registration unit 316 generates the latest binding information (see FIG. 2) by using the compatible position identifier (for example, L1i1) reported from the movement detector 315, and sends a registration request message including the latest binding information to one of the binding servers (for example, BA11 in FIG. 1). If more than one binding servers are assigned to the mobile node M1, the binding server which has registered the latest binding information reports the binding information to the other server (for example, BA12 shown in FIG. 1).

If the registration has failed in one binding server (for example, BA11 in FIG. 1 is not in operation), the binding registration unit 316 attempts to register the binding information in another binding server (for example, BA12 in FIG. 1).

The binding registration unit 316 also registers the binding information of the mobile node M1 in the binding temporary storage unit 313, or updates the binding information of the mobile node M1 stored in the binding temporary storage unit 313.

Alternatively, the binding registration unit 316 may directly send the latest binding information to a node with which the mobile node M1 is currently communicating.

The operations of the mobile node and the binding server are now discussed by using a specific example.

A description is given below, with reference to FIG. 6, of the initial setting when the mobile node 3 is moved, and the processing for sending and receiving packets. The various identifiers and the nodes to which each server is assigned are similar to those in FIG. 1.

Figure 7:
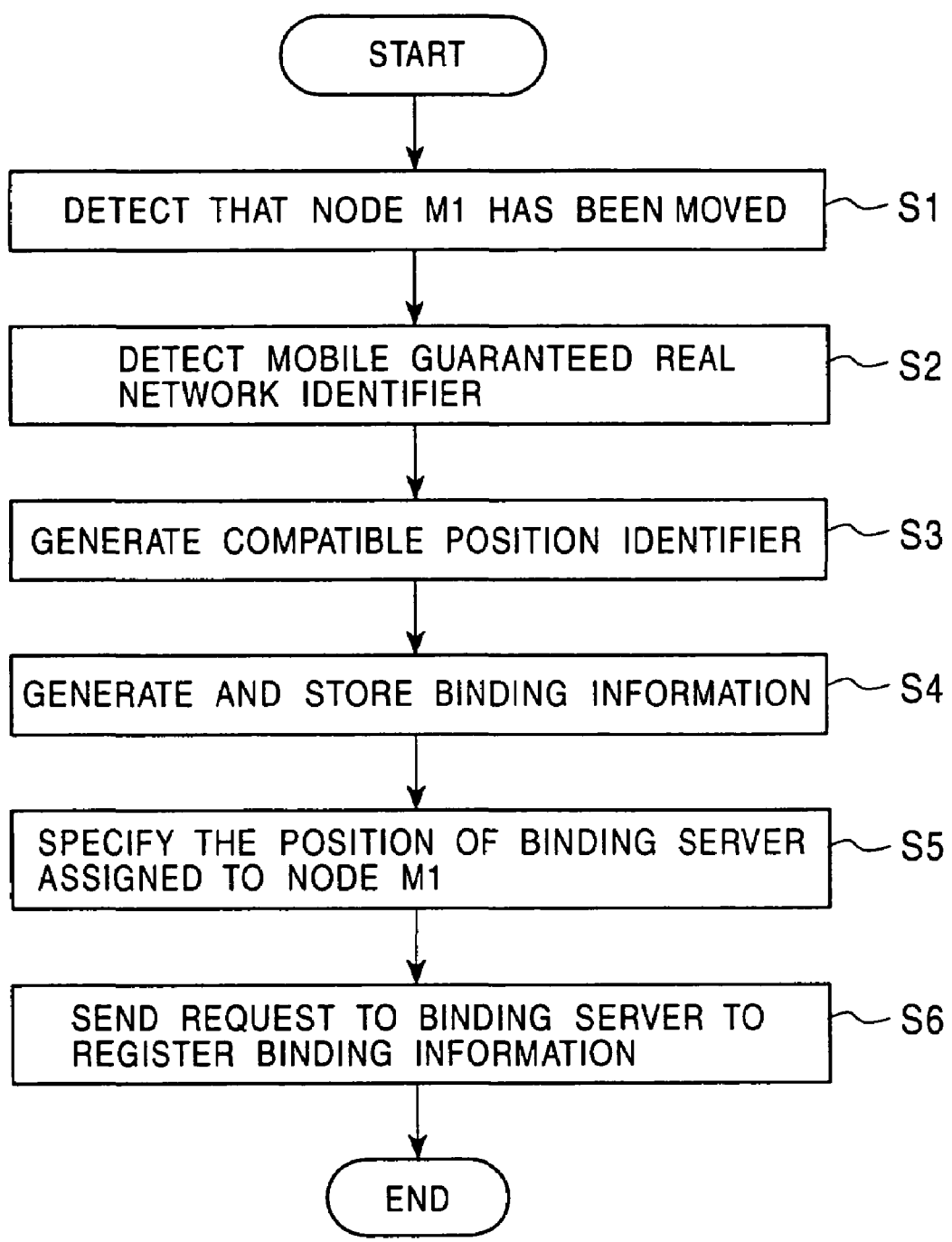
FIG. 7 is a flow chart illustrating an example of the initial setting processing when a mobile node is moved.

FIG. 7 is a flow chart illustrating an example of the initial setting processing when the mobile node 3 is moved.

It is now assumed that the mobile node M1 is moved between networks and is connected to the sub-network N1 (or, it is initially connected to the sub-network N1), and the time at which the mobile node M1 is connected to the sub-network N1 is determined to be time T1 in a built-in clock.

The mobile node M1 acquires the address which matches the regular network identifier. In this example, G1 is obtained as the regular network identifier, resulting in the regular position identifier G1m1.

By detecting that the stored regular network identifier does not coincide with the latest network identifier G1 (or the previous regular network identifier does not exist), in step S1, the movement detector 315 of the mobile node M1 detects that the mobile node M1 has been moved.

Then, in step S2, the movement detector 315 detects the mobile guaranteed real network identifier L1 usable in the sub-network to which the mobile node M1 is currently connected. In step S3, the movement detector 315 generates the compatible position identifier L1i1 from the mobile guaranteed real network identifier L1 and the node identifier i1.

In step S4, the movement detector 315 then reports the generated compatible position identifier L1i1 to the binding registration unit 316.

Subsequently, the binding registration unit 316 generates binding information and registers it in the binding temporary storage unit 313 of the mobile node M1. Alternatively, the binding registration unit 316 updates the binding information stored in the binding temporary storage unit 313.

For registering the binding information in the binding server in step S5, the binding registration unit 316 first specifies the position of the binding server which is assigned to the mobile node M1.

This is discussed more specifically by referring to a domain name system (DNS).

A DNS server corresponding to the compatible node identifier of a mobile node is prepared. A record format representing the binding servers is newly added to the DNS server. In this example, in the DNS server corresponding to the compatible node identifier Oi1 of the mobile node M1, as a record of binding servers corresponding to the compatible node identifier Oi1, B11 and B12 are registered. Similarly, for a DNS server corresponding to the compatible node identifier Oi2 of the mobile node M2, as a record of binding servers corresponding to the compatible node identifier Oi2, B21 and B22 are registered.

The binding registration unit 316 of the mobile node M1 queries the appropriate DNS server about the binding servers corresponding to the compatible node identifier Oi1 of the mobile node M1.

In response to the query from the mobile node M1, the DNS server traces the DNS tree to detect the DNS server which manages the compatible node identifier Oi1. If the detected DNS server is found to be the DNS server which has received the query from the mobile node M1, the DNS server returns the answer, that is, the binding servers B11 and B12, to the mobile node M1.

If the DNS server which manages the compatible node identifier Oi1 is found to be a DNS server other than the DNS server which has received the query from the mobile node M1, the latter DNS server queries the detected DNS server about the binding server corresponding to the compatible node identifier Oi1. The detected DNS server then returns the answer, that is, the binding servers B11 and B12, to the requested DNS server. Then, the DNS server which has received the request from the mobile node M1 returns the same answer, that is, B11 and B12, to the mobile node M1.

Subsequently, in step S6, the mobile node M1 selects one of the binding servers B11 and B12, and sends a registration request message containing the latest binding information (Oi1, L1i1, T1, and LT1) to the selected binding server (in this example, B11) (see p1 in FIG. 6). As stated above, T1 indicates the time at which the mobile detector 315 detected that the mobile node M1 was moved), and LT1 represents the effective period of the binding information.

Figure 6:
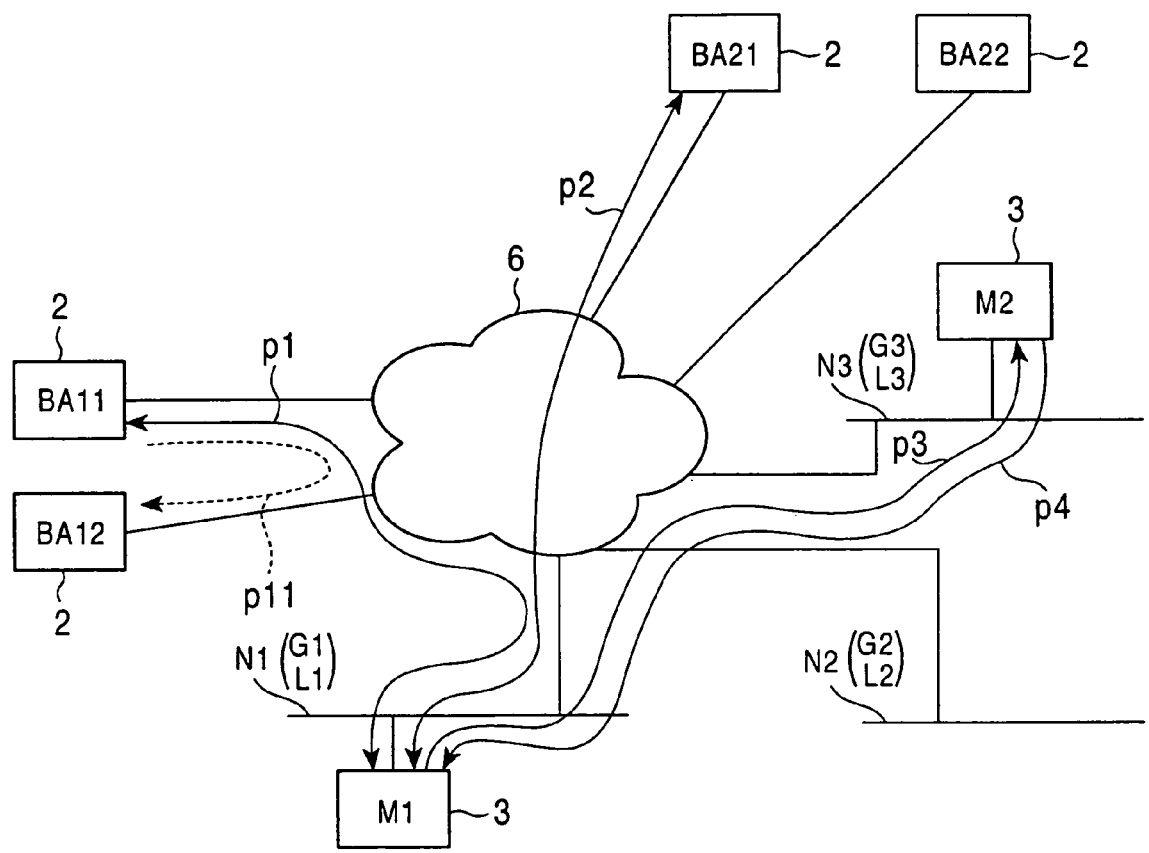
FIG. 6 illustrates the operation performed by the embodiment shown in FIG. 1.

After the mobile node M1 sends a registration request message including the latest binding information to the binding server B11, the binding registration receiver 22 of the binding server B11 receives this message (see p1 in FIG. 6). The binding registration receiver 22 then reports this registration content to the binding storage unit 21. The binding storage unit 21 determines whether the sender is the mobile node M1. If the sender is authenticated, the binding storage unit 21 adds the received information to the currently stored information, or updates the information of the mobile node M1. Then, the binding storage unit 21 informs the completion of the registration to the mobile node M1 (see p1 in FIG. 1), and the mobile node M1 receives this message.

Subsequently, the binding server B11 specifies the position of another binding server which manages the mobile node M1. In this example, the binding server B11 detects the position of the binding server B12, and thus sends the received binding information of the mobile node M1 to the binding server B12 (see p11 in FIG. 6).

Upon receiving the binding information from the binding server B11, the binding server B12 checks whether this binding information has been sent from the mobile node M1. The binding server B12 first determines whether the binding information is sent from the binding server B11. If so, the binding server B12 searches the binding information stored in the binding server B12 for the information concerning the compatible node identifier Oi1. If so, the time of the detected binding information is compared with that received from the binding server B11. If the time of the received information is found to be later, the information is updated by this information. If not, the received information from the binding server B11 is discarded.

The same applies to when the mobile node M2 is connected to the sub-network N3 at time T2.

The same also applies to when the mobile node M1 sends a registration request containing the latest binding information to the binding server B12 and when the binding server B12 sends the same registration content to the binding server B11.

The mobile node M1 is now able to use the regular position identifier G1m1 and the compatible position identifier L1i1 as the position identifiers of the mobile node M1. This enables the other mobile nodes, such as the mobile node M2, to search for the current compatible position identifier L1i1 by querying the binding server.

Similarly, the mobile node M2 is able to use the regular position identifier G3m2 and the compatible position identifier L3i2 as the position identifiers of the mobile node M2. This enables the other mobile nodes, such as the mobile node M1, to search for the current compatible position identifier L3i2 of the mobile node M2 by querying the binding server.

In this case, the binding information of the mobile node M1 stored in the binding servers B11 and B12 can be indicated by the one shown in FIG. 2. Likewise, the binding information of the mobile node M2 stored in the binding servers B21 and B22 can be indicated by the one shown in FIG. 3.

A description is given below, with reference to FIG. 6, the second communication performed between the mobile node M1 which has registered the latest binding information when being connected to the sub-network N1 and the mobile node M2 connected to the sub-network N3. In this example, a packet is to be transmitted from the mobile node M1 to the mobile node M2.

Figure 8:
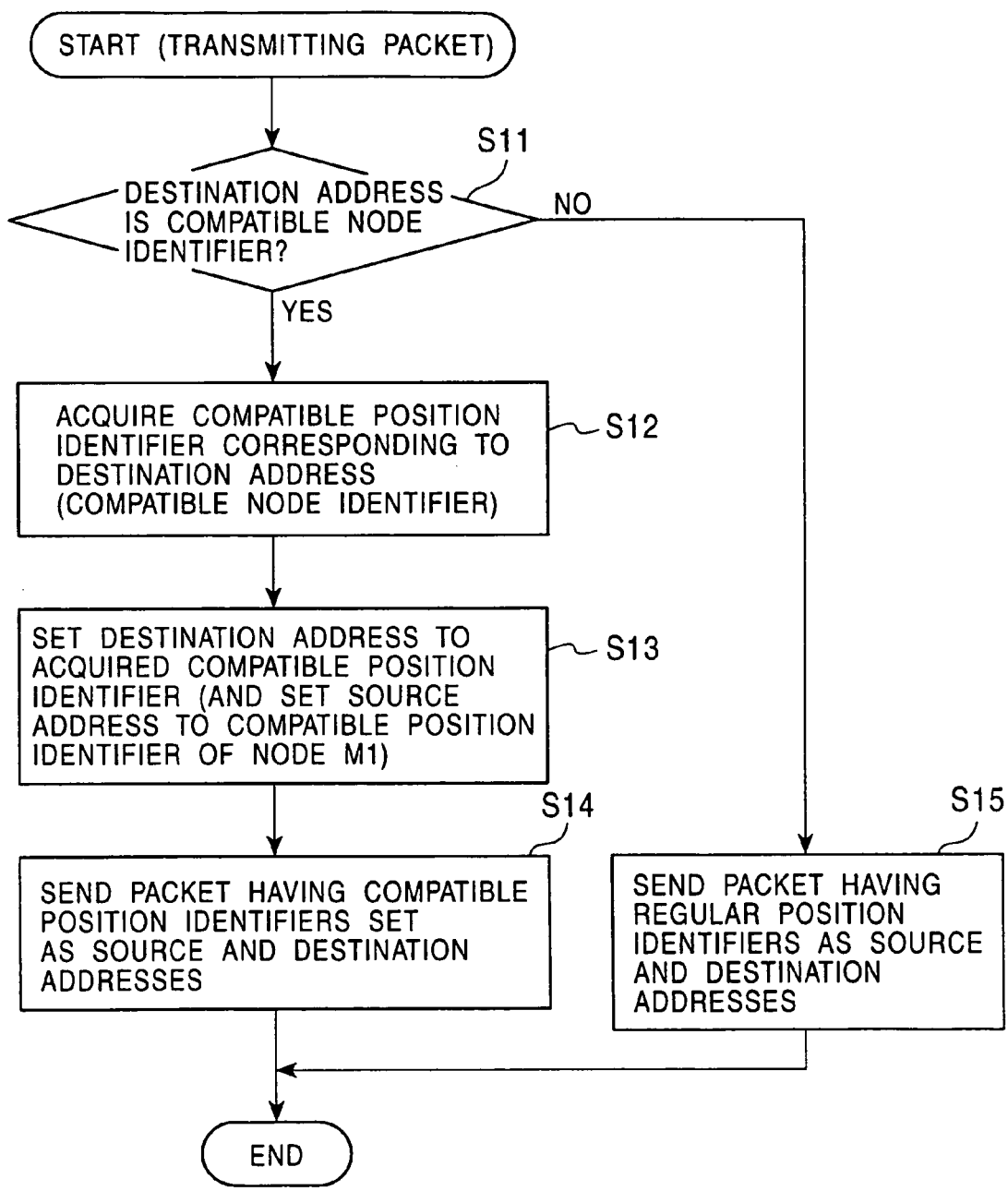
FIG. 8 is a flow chart illustrating an example of the packet transmitting processing performed by a mobile node.

An example of the packet transmitting processing performed by the mobile node M1 is discussed below with reference to FIG. 8.

The user of the mobile node M1 specifies the compatible node identifier Oi2 as the IP address so as to communicate with the mobile mode M2. After a packet to be transmitted from the mobile node M1 to the mobile node M2 is generated, the binding determining unit 311 of the mobile node M1 receives the packet. Then, in step S11, the binding determining unit 311 determines whether the destination address to be transmitted is a regular position identifier or a compatible node identifier.

In this example, since the destination address is Oi2, which contains the mobile guaranteed general network identifier O, the binding determining unit 311 determines that the destination address is a compatible node identifier, in other words, the binding determining unit 311 determines that the second communication is to be performed, and delivers the packet to the binding processor 312.

In step S12, the binding processor 312 then searches for the compatible position identifier corresponding to the above-mentioned compatible node identifier.

More specifically, the binding processor 312 first queries the binding temporary storage unit 313 as to the binding information concerning the compatible node identifier Oi2 designated as the destination address. If the corresponding binding information is stored in the binding temporary storage unit 313, the binding temporary storage unit 313 returns it to the binding processor 312. In this example, however, the packet to be transmitted to the mobile node M2 is the first packet addressed to the mobile node M2, the binding temporary storage unit 313 does not store binding information concerning the compatible node identifier Oi2 of the mobile node M2. Thus, the binding processor 312 requests the binding solving unit 314 to acquire the binding information concerning the compatible node identifier Oi2.

In response to this request, the binding solving unit 314 first searches for the binding servers which are assigned to the compatible node identifier Oi2. As a result, in this example, the positions of the binding servers B21 and B22 are detected. The binding solving unit 314 then queries one of the binding servers B21 and B22 (in this case, the binding server B21) about the binding information of the compatible node identifier oi2 (see p2 in FIG. 6).

The binding response unit 23 of the binding server B21 receives the query from the mobile node M1, and requests the binding storage unit 21 to extract the binding information of the compatible node identifier Oi2. Since the binding server B21 stores the information shown in FIG. 3, the binding storage unit 21 reports the binding information Oi2, L3i2, T2, and LT2 to the binding response unit 23. The binding response unit 23 then notifies this binding information to the mobile node M1 (see p2 in FIG. 6).

Upon receiving the binding information from the binding server B21, the binding solving unit 314 of the mobile node M1 reports it to the binding temporary storage unit 313.

The binding temporary storage unit 313 receives the binding information and stores it therein, and then transfers this binding information to the binding processor 312, which is waiting for the answer.

Upon receiving the binding information, in step S13, the binding processor 312 changes the destination address from the compatible node identifier Oi2 to the compatible position identifier L3i2, and when the above-described technique (4) is employed, the binding processor 312 writes the compatible position identifier L1i1 of the mobile node M1 into the source address of the packet to be transmitted. Then, the binding processor 312 delivers this packet to the IP processor 317. If the aforementioned technique (1) is employed rather than technique (4), the binding processor 312 informs the IP processor 317 that the destination address of the packet is a compatible position identifier, and the IP processor 317 changes the source address of the packet into the compatible position identifier L1i1 of the mobile node M1.

Ultimately, in step S14, the packet having the compatible position identifier L1i1 as the source address and the compatible position identifier L3i2 as the destination address is transmitted from the mobile node M1 to the mobile node M2 (see p3 in FIG. 6). However, the destination address of the mobile node M2 identified by the mobile node M1 still remains as the compatible node identifier Oi2 rather than the compatible position identifier L3i2. This is unchanged regardless of to which network the mobile node M2 is connected.

In sending another packet from the mobile node M1 to the mobile node M2, it is no longer necessary for the mobile node M1 to query the binding server about the binding information concerning the mobile node M2 since the binding temporary storage unit 313 already stores the binding information. The mobile node M1 thus simply generates a packet having the compatible position identifier L1i1 as the source address and the compatible position identifier L3i2 as the destination address according to the binding information stored in the binding temporary storage unit 313, and sends the packet to the mobile node M2.

Figure 9:
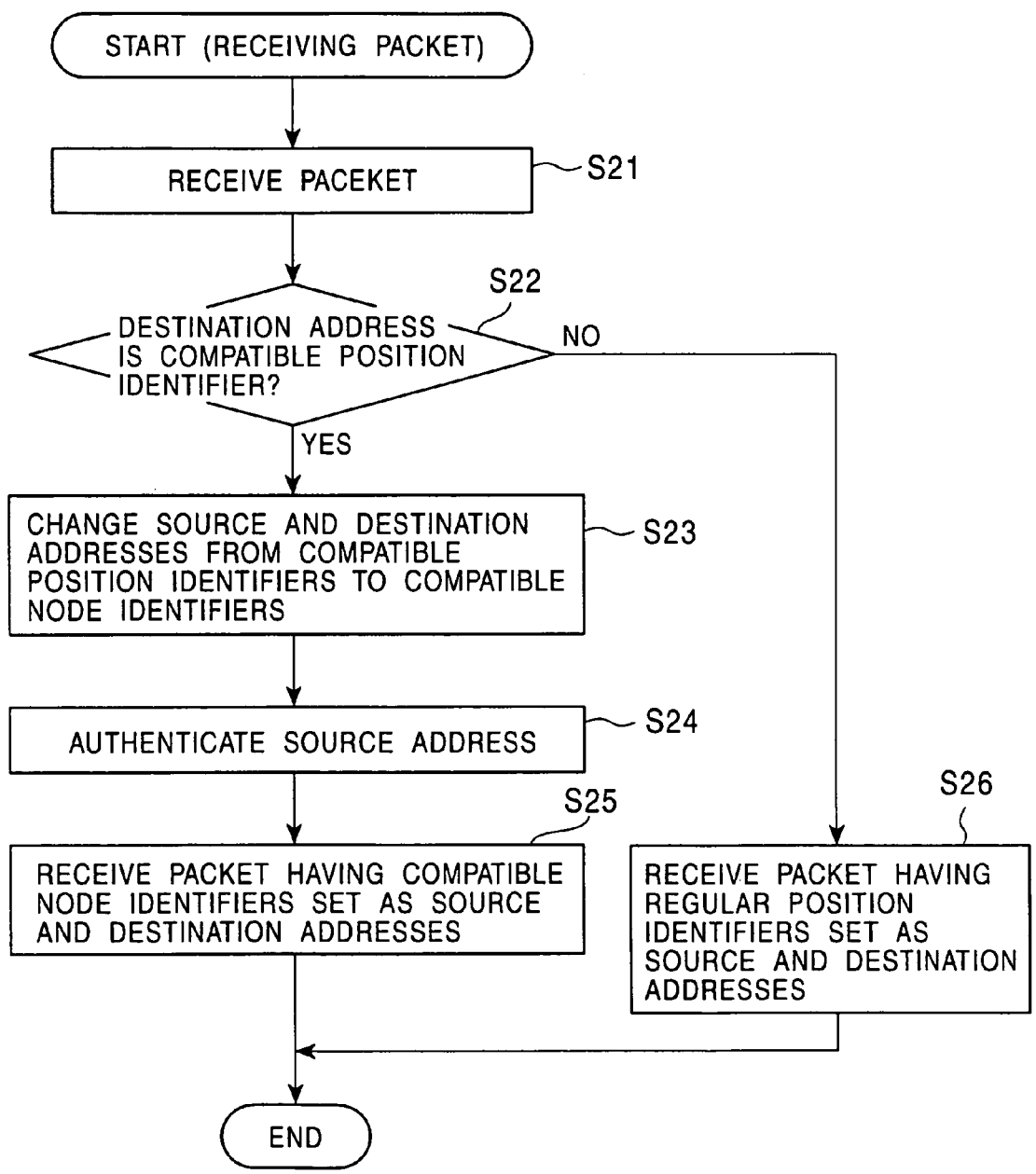
FIG. 9 is a flow chart illustrating an example of the packet receiving processing performed by a mobile node.

An example of the packet receiving processing is discussed below with reference to FIG. 9.

In step S21, the packet transmitted from the mobile node M1 is delivered to the network position specified by the destination address L3i2 and reaches the mobile node M2 (see p4 in FIG. 6).

Subsequently, in step S22, the binding determining unit 311 of the mobile node M2 checks the source address and the destination address of the received packet. Since both the source address L1i1 and the destination address L3i2 contain mobile guaranteed real network identifiers, the binding determining unit 311 determines that the source address and the destination address are compatible position identifiers, in other words, the binding determining unit 311 determines that the second communication is being performed, and delivers the received packet to the binding processor 312.

In step S23, the binding processor 312 of the mobile node M2 substitutes the mobile guaranteed real network identifiers of the source and destination addresses by the mobile guaranteed general network identifiers, thereby converting the compatible position identifiers into the compatible node identifiers. In this example, the source address is converted into Oi1 and the destination address is converted into Oi2.

In step S24, the binding processor 312 then determines whether the relationship between the compatible position identifier L1i1 set as the source address and the compatible node identifier Oi1 converted from the received source address is valid.

For example, when the packet is provided with an authenticator, the binding processor 312 checks whether the authenticator is valid. If so, the binding processor 312 determines that the relationship between the compatible node identifier and the compatible position identifier is valid. When an authenticator is not attached to the packet, the binding processor 312 may query the binding temporary storage unit 313 about the binding information of the compatible node identifier Oi1. In this case, if the binding information obtained from the binding temporary storage unit 313 coincides with the relationship between the compatible node identifier and the compatible position identifier determined from the received packet, the source address is authenticated. If the above-described two items of information do not coincide with each other, the binding processor 312 requests the binding temporary storage unit 313 to acquire the latest binding information (from the binding server) once again. If the binding information received from the binding server does not coincide with the relationship between the compatible node identifier and the compatible position identifier, the binding processor 312 determines that the received packet has not been sent from a mobile node provided with the compatible node identifier Oi1. Thus, authentication has failed. If the above-mentioned two items of information coincide with each other, authentication has succeeded.

If authentication has succeeded, in step S25, the packet is delivered from the binding processor 312 to the IP processor 317, and the receiving processing is allowed to continue. If authentication has failed, the packet is discarded, and the receiving processing performed by the IP processor 317 is interrupted.

As for the case of the mobile node M1, the source address identified by the mobile node M2 is the compatible node identifier Oi1 rather than the compatible position identifier L1i1.

The detection of the movement of a mobile node by another mode is discussed below with reference to FIG. 10. It is now assumed in that FIG. 10 illustrates a network in which the mobile node M1 and the mobile node M2 shown in FIG. 6 are performing the second communication.

FIG. 11 illustrates an example of the processing for detecting the movement of a mobile node by another mobile node while communication is being performed between the two nodes.

During the second communication which supports the movement of mobile nodes, i.e., when performing communication while performing conversion between a compatible node identifier and a compatible position identifier by using binding information, it is assumed that an error message is returned to the mobile node which has sent a packet, indicating that the packet has not reached the destination address. In this case, the destination mobile node may have been moved. Upon receiving the error message, the sender mobile node obtains the latest binding information from the destination mobile node, thereby restarting the communication.

Figure 10:
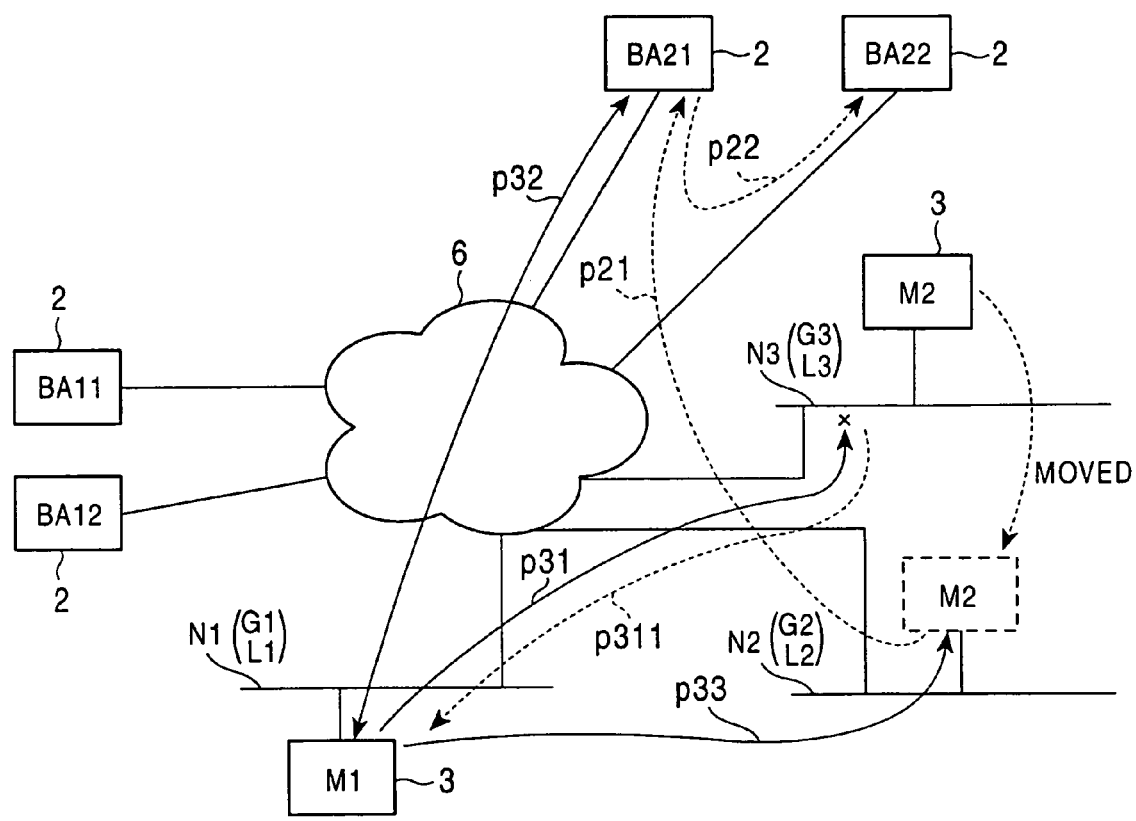
FIG. 10 illustrates the operation performed by the embodiment shown in FIG. 1.

For example, the mobile node M1 connected to the sub-network N1 and the mobile node M2 connected to the sub-network N3 were performing the second communication, as shown in FIG. 6, and then, the mobile node M2 has been moved to the sub-network N2, as shown in FIG. 10. The mobile node M1 sends a packet addressed to the mobile node M2 to the sub-network N3 without knowing that the mobile node M2 has been moved to the sub-network N2.

After being moved to the sub-network N2, the mobile node M2 reports the latest binding information (for example, Oi2, L2i2, T3, and LT3) of the mobile node M2 to the binding node (for example, B21) assigned to the mobile node M2 (see p21 in FIG. 10). The binding node B21 then reports the latest binding information to the binding node B22 (see p22 in FIG. 10).

However, if L3i2 still remains in the binding temporary storage unit 313 of the mobile node M1 as the current compatible position identifier of the mobile node M2, the mobile node M1 sends a packet having the compatible position identifier L3i2 as the destination address to the mobile node M2 (see p31 in FIG. 10).

The packet reaches the router (not shown) connected to the sub-network N3. However, since the mobile node M2 has been moved to the sub-network N2, the router detects after the lapse of a predetermined period that there is no node having the address L3i2 in the sub-network N3. In this case, the router returns an error message to the mobile node M1 indicating that the packet has not reached the node M2 (see p311 in FIG. 10).

Upon receiving this error message, in step S31, the mobile node M1 detects that the mobile node M2 has been moved from the sub-network N3.

Then, the mobile node M1 first nullifies the binding information of the mobile node M2 stored in the binding temporary storage unit 313, and also makes a query about the binding information concerning the compatible node identifier Oi1. In this case, the binding temporary storage unit 313 requests the binding solving unit 314 to acquire the required binding information from the binding server. If the mobile node M2 has been moved as discussed above, in step S32, the binding information reflecting the correct current position of the mobile mode M2 is obtained from the binding server B21 or B22 (see p32 in FIG. 10).

Upon receiving the latest binding information (for example, Oi2, L2i2, T3, and LT3), the binding temporary storage unit 313 is requested to update the previous binding information by the latest information. Then, in step S33, the binding processor 312 restarts the transmitting processing by changing the destination address of the packet into the new compatible position identifier L2i2 of the mobile node M2, and re-transmits the packet having the compatible position identifier L2i2 as the destination address (see p33 in FIG. 10).

If the mobile node M2 is not connected to any network, or if the latest binding information is not registered in the binding server assigned to the mobile node M2 even if the mobile node M2 is connected to a network, the mobile node M1 discontinues communication with the mobile node M2, or repeats the above-described processing after the lapse of a predetermined period.

The first communication performed between mobile nodes is described below with reference to FIG. 12. Various identifiers and a node to which each server is assigned are similar to those in the example in FIG. 1.

It may sometimes be desired that a mobile node performs the first communication with another mobile node for detecting a failure even if they are capable of performing the second communication. In this case, as the IP address designated as the destination node, a regular position identifier is used rather than a compatible position identifier. Upon receiving a packet, the receiver node detects that the source and destination addresses of the received packet are regular position identifiers, and thus performs the first communication.

The processing for transmitting a packet when the first communication is performed between mobile nodes is discussed below with reference to FIG. 8.

The user of the mobile node M1 specifies the regular position identifier G3m2 as the IP address so as to communicate with the mobile node M2. After generating a packet to be transmitted from the mobile node M1 to the mobile node M2, the binding determining unit 311 of the mobile node M1 receives the packet. In step S11, the binding determining unit 311 determines whether the destination address of the packet is a regular position identifier or a compatible node identifier. In this example, since the destination address is G3m2, which does not contain the mobile guaranteed general network identifier O, the binding determining unit 311 determines that the destination address is a regular position identifier, in other words, the binding determining unit 311 determines that the first communication is to be performed. Thus, the transmitting processing is continued without converting the addresses using the binding information.

Accordingly, in this case, in step S15, the packet having the regular position identifier G1m1 as the source address and the regular position identifier G3m2 as the destination address is transmitted from the mobile node M1 to the mobile node M2 (see p41 in FIG. 12).

The processing for receiving a packet when the first communication is performed between mobile nodes is described below with reference to FIG. 9.

In step S21, the packet transmitted from the mobile node M1 as discussed above is delivered to the network position designated by the destination address G3m2 and reaches the mobile node M2 (see p41 in FIG. 12).

In step S22, the binding determining unit 311 of the mobile node M2 determines whether the source address and the destination address of the received packet are regular position identifiers or compatible node identifiers. Since the source address G1m1 and the destination address G3m2 do not contain a mobile guaranteed real network identifier, the binding determining unit 311 determines that the source and destination addresses of the packet are regular position identifiers, in other words, the binding determining unit 311 determines that the first communication is being performed.

In step S26, the packet having the regular position identifiers as the source and destination addresses is then received.

Communication performed from a mobile node to a fixed node is discussed below with reference to FIG. 12.

In transmitting a packet from a mobile node to a fixed node, regular position identifiers are specified as the source and destination addresses, and thus, the first communication is to be conducted (see p42 in FIG. 12).

This is described more specifically. It is now assumed that a packet is transmitted from the mobile node M1 connected to the sub-network N1 to the fixed node C1 connected to the sub-network N3.

The processing for transmitting a packet by the mobile node M1 is discussed below with reference to FIG. 8.

The user of the mobile node M1 specifies G3c1 as the IP address to communicate with the fixed node C1. After generating a packet to be transmitted from the mobile node M1 to the fixed node C1, the binding determining unit 311 of the mobile node M1 receives the packet. Then, in step S11, the binding determining unit 311 determines whether the destination address of the packet is a regular position identifier or a compatible node identifier. In this example, since the destination address is G3c1, which does not contain the mobile guaranteed general network identifier O, the binding determining unit 311 determines that the destination address is a regular position identifier, in other words, the binding determining unit 311 determines that the first communication is to be performed. The transmitting processing is thus executed without converting the addresses using the binding information.

Accordingly, in step S15, the packet having the regular position identifier G1m1 as the source address and the regular position identifier G3c1 as the destination address is transmitted from the mobile node M1. The packet then reaches the fixed node C1 which is positioned at G3c1 through the network (see p42 in FIG. 12).

If the mobile node M1 is moved from the sub-network N1, communication from the mobile mode M1 to the fixed node C1 is discontinued. As long as the mobile node M1 remains in the sub-network N1, it is possible to communicate with the fixed node C1.

A description is now given of the first communication performed from a fixed node to a mobile node with reference to FIG. 12.

A fixed node never uses an address containing a mobile guaranteed real network identifier. That is, basically, a fixed node does not obtain a compatible position identifier. In transmitting a packet from a fixed node to a mobile node, since regular position identifiers are specified as the source and destination addresses, the first communication is to be performed (see p43 in FIG. 12).

This is described more specifically. It is now assumed that a packet is to be transmitted from the fixed node C1 connected to the sub-network N3 to the mobile node M1 connected to the sub-network N1.

The processing for receiving a packet by the mobile node M1 is discussed below with reference to FIG. 9.

The user of the fixed node C1 specifies the regular position identifier G1m1 as the destination address to communicate with the mobile node M1.

The packet having the regular position identifier G3c1 as the source address and the regular position identifier G1m1 as the destination address is transmitted from the fixed node C1 to the network. Then, in step S21, the packet is received by the mobile node M1 (see p43 in FIG. 12).

In step S22, the binding determining unit 311 of the mobile node M2 checks the source address and the destination address of the received packet. Since the source address G3c1 and the destination address G1m1 of this packet do not contain a mobile guaranteed real network identifier, the binding determining unit 311 determines that the source and destination addresses are regular position identifiers, in other words, the binding determining unit 311 determines that the first communication is being performed.

Then, in step S26, the packet having the regular position identifiers as the source and destination addresses is received.

If the mobile node M1 is moved from the sub-network N1, communication between the mobile node M1 and the fixed node C1 is discontinued. As long as the mobile node M1 remains in the sub-network N1, it is possible to communicate with the fixed node C1.

Between fixed nodes, as shown in FIG. 12, the first communication using regular position identifiers is performed (see p44 in FIG. 12).

More specifically, the user of the fixed node C1 specifies the regular position identifier G2c2 as the destination address of a packet to communicate with the fixed node C2. Then, the packet having the regular position identifier G3c1 as the source address and the regular position identifier G2c2 as the destination address is transmitted to the network and reaches the fixed node C2 which is positioned at G2c2. The fixed node C2 then receives this packet.

Similarly, the user of the fixed node C2 designates the regular position identifier G3c1 as the destination address of a packet to communicate with the fixed node C1. Thus, the packet having the regular position identifier G2c2 as the source address and the regular position identifier G3c1 as the destination address is transmitted from the fixed node C2 to the network and reaches the fixed node C1 which is positioned at G3c1. The fixed node C1 then receives this packet.

This embodiment has been described, assuming that the format of the source address and the format of the destination address are the same. If they are different, for example, if the source address is a regular position identifier and the destination address is a compatible position identifier (other combinations may be considered), the following approaches may be considered: (1) an error message is returned; (2) the first communication is performed by giving priority to the regular position identifier; (3) the second communication is performed by giving priority to the compatible position identifier; and (4) a suitable approach is selected from (1) through (3) or from (2) and (3).

As discussed above, according to this embodiment, instead of using the concept of a home network, which is employed in the conventional mobile IP, a binding server is provided for identifying a relationship between a compatible node identifier which uniquely specifies a mobile node and a compatible position identifier which uniquely specifies the position of the mobile node on a network. Accordingly, binding information concerning a mobile node to be communicated can be acquired from the binding server, and packets can be transmitted and received while automatically performing conversion between a compatible node identifier and a compatible position identifier. It is thus possible to enhance redundancy of the binding server. Additionally, the need for using the encapsulating technique can be eliminated, thereby making it possible to reduce the protocol overhead while the second communication is performed by using a compatible node identifier/compatible position identifier. A mobile computer is able to perform both the first communication using a regular position identifier and the second communication using a compatible node identifier/compatible position identifier, thereby enabling communication between a mobile node and a fixed node.

The above-described functions may be implemented by software.

This embodiment may be implemented by a computer-readable recording medium for storing a program which causes a computer to execute predetermined means (or which causes a computer to function as predetermined means, or causes a computer to implement predetermined functions).

The present invention is not restricted to the aforementioned embodiment, and various modifications may be made within the technical range of the invention.

What is claimed is:

1. A position identifier management apparatus for supporting the movement of a mobile computer between networks, comprising:
   storage means for storing binding information concerning said mobile computer managed by said position identifier management apparatus, said binding information including a compatible node identifier for uniquely specifying said mobile computer and a compatible position identifier for uniquely specifying a position of said mobile computer on a network;
   registration means for registering the binding information in said storage means in response to a registration request to register the binding information from another position identifier management apparatus; and
   transmitting means for transmitting the binding information in response to a query about the binding information concerning said mobile computer from another position identifier management apparatus when said binding information is stored in said storage means;
   wherein the compatible node identifier of said mobile computer comprises a first virtual network identifier assigned to said mobile computer which moves between networks and a node identifier for uniquely specifying said mobile computer, and the compatible position identifier of said mobile computer comprises a second network identifier which is usable only by mobile computers assigned to a network to which said mobile computer is connected and the node identifier.

2. A position identifier management apparatus according to claim 1, further comprising:
   means for registering binding information contained in the received registration request after detecting that a sender of the received registration request is an another mobile computer and authenticating said another mobile computer as a valid mobile computer;
   means for sending said registration request to an another position identifier management apparatus which also manages said another mobile computer when said another mobile computer is authenticated as a valid mobile computer; and
   means for registering the binding information contained in the received registration request in said storage means after detecting that the sender of the received registration request is an another position identifier management apparatus and authenticating said another position identifier management apparatus as a valid apparatus.

3. A position identifier management apparatus according to claim 1, wherein said transmitting means transmits the binding information containing the compatible node identifier which is identical to the compatible node identifier contained in the query.

4. A position identifier management apparatus according to claim 1, wherein the binding information includes a registered time and an effective period, and said position identifier management apparatus further comprises means for erasing the binding information which has expired.

5. A mobile computer which moves between networks, comprising:
   first storage means for storing binding information including a compatible node identifier and a compatible position identifier, the compatible node identifier including a first virtual network identifier assigned to said mobile computer which moves between networks and a node identifier for uniquely specifying said mobile computer, the compatible position identifier including a second network identifier which is usable only by mobile computers assigned to a network to which said mobile computer is connected and the node identifier;
   second storage means for storing binding information concerning at least one of other mobile computers with which said mobile computer is to communicate, said binding information including a compatible node identifier and a compatible position identifier, the compatible node identifier including a first virtual network identifier assigned to said at least one of other mobile computers which moves between networks and a node identifier of said at least one of other mobile computers, the compatible position identifier including a second network identifier which is usable only by mobile computers assigned to a network to which said at least one of other mobile computers is connected and the node identifier of said at least one of other mobile computers;
   determining means for determining whether the binding information is to be used for a packet transmitting or receiving operation; and conversion means for performing, when said determining means determines that the binding information is to be used, a conversion operation by converting the compatible node identifier to the compatible position identifier when the packet is to be transmitted and by converting from the compatible position identifier to the compatible node identifier when the packet is to be received.

6. A mobile computer according to claim 5, wherein said determining means determines that the conversion operation is to be performed by said conversion means when a destination address of the packet to be transmitted is designated with said compatible node identifier.

7. A mobile computer according to claim 6, wherein, when said determining means determines that the conversion operation is to be performed by said conversion means in order to transmit the packet, said conversion means acquires the compatible position identifier corresponding to the compatible node identifier which designates the destination address of the packet to be transmitted, and then converts the destination address of the packet into the acquired compatible position identifier, and sets the compatible position identifier of said mobile computer stored in said first storage means as a source address of the packet.

8. A mobile computer according to claim 5, wherein said determining means determines that the conversion operation is to be performed by said conversion means when a source address and a destination address of the packet to be received are designated with the compatible position identifiers.

9. A mobile computer according to claim 8, wherein, when said determining means determines that the conversion operation is to be performed by said conversion means in order to receive the packet, said conversion means converts the compatible position identifier into the compatible node identifier by at least substituting the second network identifier contained in the compatible position identifier which designates the source address of the packet by the first virtual network identifier, and also verifies the integrity of the compatible node identifier which designates the source address of the packet.

10. A mobile computer according to claim 5, wherein, when said determination means determines that the conversion operation by said conversion means is not performed, it is assumed that each of a source address and a destination address of the packet is a position identifier for uniquely specifying the position of said mobile computer on a network and containing a third network identifier which does not support the movement of said mobile computer, and the packet is transmitted or received by using said source address and said destination address.

11. A mobile computer according to claim 5, further comprising:
movement detection means for detecting the movement of said mobile computer by a change in a third network identifier which does not support the movement detected on a network to which said mobile computer is connected;
acquiring means for acquiring the second network identifier when the movement of said mobile computer is detected;
generating means for generating new binding information based on the acquired second network identifier; and
updating means for updating the binding information concerning said mobile computer stored in said first storage means by the new binding information generated by said generating means.

12. A mobile computer according to claim 11, further comprising:
first specifying means for specifying a position identifier management apparatus which manages said mobile computer from among a plurality of position identifier management apparatuses, disposed on a network, for storing the binding information which is requested to be registered by mobile computers managed by said plurality of position identifier management apparatuses and for responding to a query about the binding information; and
registration request sending means for sending the new binding information concerning said mobile computer generated by said generating means to the position identifier management apparatus specified by said first specifying means.

13. A mobile computer according to claim 5, further comprising:
second specifying means for specifying a position identifier management apparatus which manages an another mobile computer with which said mobile computer is to communicate, from among the plurality of position identifier management apparatuses, disposed on the network, for storing the binding information which is requested to be registered by mobile computers managed by said plurality of position identifier management apparatuses, and for responding to a query about the binding information;
query sending means for sending, when said second storage means does not store effective binding information about said another mobile computer, a query about the binding information concerning said another mobile computer containing the compatible node identifier to the position identifier management apparatus specified by said second specifying means;
response receiving means for receiving a response to the query from the position identifier management apparatus specified said second specifying means; and
registration means for registering the binding information concerning said another mobile computer contained in the received response in said second storage means.

14. A mobile computer according to claim 5, wherein the binding information includes a registered time and an effective period, and said mobile computer further comprises means for erasing the binding information which has expired.

15. A position identifier management method comprising:
storing by a mobile computer latest binding information including a compatible node identifier and a compatible position identifier in storage means of said mobile computer when the movement of said mobile computer is detected, the compatible node identifier containing a first virtual network identifier assigned to said mobile computer which moves between networks and a node identifier for uniquely specifying said mobile network, the compatible position identifier containing a second network identifier which is usable only by mobile computers assigned to a network to which said mobile computer is moved and the node identifier;
specifying by said mobile computer at least one position identifier management apparatus which manages said mobile computer from among a plurality of position identifier management apparatuses, disposed on a network, for storing the latest binding information of said mobile computer which is requested to be registered from another mobile computer managed by one of said plurality of position identifier management apparatuses, and for responding to a query about the latest binding information;

sending a registration request to register the latest binding information about said mobile computer from said mobile computer to one of the specified position identifier management apparatuses;

storing the binding information contained in the registration request in a storage means of said one of the specified position identifier management apparatuses which has received the registration request after said one of the specified position identifier management apparatuses detects that the sender of the registration request is said mobile computer and authenticates said mobile computer as a valid mobile computer; and sending the registration request to another position identifier management apparatus which also manages said mobile computer after said mobile computer which has sent the registration request is authenticated as a valid mobile computer.

16. A position identifier management method according to claim 15, wherein said mobile computer sends a query containing the position node identifier of said mobile computer to a server for storing a relationship between the compatible node identifier and an address of a position identifier management apparatus which manages said mobile computer provided with the compatible node identifier, and receives a response to the query from said server, thereby specifying the at least one position identifier management apparatus which manages said mobile computer.

17. A position identifier processing method for a mobile computer, comprising the steps of:

storing at the mobile computer binding information including a compatible node identifier and a compatible position identifier in storage means of said mobile computer, the compatible node identifier containing a first virtual network identifier assigned to said mobile computer which moves between networks and a node identifier for uniquely specifying said mobile computer, the compatible position identifier containing a second network identifier which is usable only by mobile computers assigned to a network to which said mobile computer is connected and the node identifier;

acquiring, at the mobile computer, when a destination address of a packet to be transmitted is designated with the compatible node identifier and when said storage means does not store the compatible node identifier, the binding information containing the compatible node identifier by making a query to a position identifier management apparatus which manages the binding information concerning a mobile computer provided with the compatible node identifier; and converting at the mobile computer the compatible node identifier representing the destination address of the packet to be transmitted into the acquired compatible position identifier, and setting the compatible position identifier of said mobile computer stored in said storage means as the source address of the packet.

18. A position identifier processing method according to claim 17, wherein, when an error message indicating that the packet has not reached is returned after sending the packet having the compatible position identifier as the source address and the destination address, a query is made to the position identifier management apparatus which manages the binding information concerning the mobile node provided with the compatible node identifier corresponding to the compatible position identifier so as to acquire the latest binding information concerning the mobile computer provided with the compatible node identifier, and then, the packet is re-transmitted.

19. A position identifier processing method for a mobile computer, comprising the steps of:

storing binding information including a compatible node identifier and a compatible position identifier in storage means of said mobile computer, the compatible node identifier containing a first virtual network identifier assigned to said mobile computer which moves between networks and a node identifier for uniquely specifying said mobile computer, the compatible position identifier containing a second network identifier which is usable only by mobile computers assigned to a network to which said mobile computer is connected and the node identifier; and converting, when each of a source address and a destination address of a received packet is designated with the compatible position identifier, the compatible position identifier into the compatible node identifier by at least substituting the second network identifier of the compatible position identifier which designates the source address of the packet by the first network identifier, and also verifying the integrity of the compatible node identifier which designates the source address of the packet.

20. A position identifier management apparatus for supporting the movement of a mobile computer between networks, comprising:

storage unit configured to store binding information concerning said mobile computer managed by said position identifier management apparatus, said binding information including a compatible node identifier for uniquely specifying said mobile computer and a compatible position identifier for uniquely specifying a position of said mobile computer on a network;

registration unit configured to register the binding information in said storage unit in response to a registration request to register the binding information from another position identifier management apparatus; and transmitting unit configured to transmit the binding information in response to a query about the binding information concerning said mobile computer from another position identifier management apparatus when said binding information is stored in said storage unit;

wherein the compatible node identifier of said mobile computer comprises a first virtual network identifier assigned to said mobile computer which moves between networks and a node identifier for uniquely specifying said mobile computer, and the compatible position identifier of said mobile computer comprises a second network identifier which is usable only by mobile computers assigned to a network to which said mobile computer is connected and the node identifier.

21. A mobile computer which moves between networks, comprising:

first storage unit configured to store binding information including a compatible node identifier and a compatible position identifier, the compatible node identifier including a first virtual network identifier assigned to said mobile computer which moves between networks and a node identifier for uniquely specifying said mobile computer, the compatible position identifier including a second network identifier which is usable only by mobile computers assigned to a network to which said mobile computer is connected and the node identifier;

second storage unit configured to store binding information concerning at least one of other mobile computers with which said mobile computer is to communicate, said binding information including a compatible node identifier and a compatible position identifier, the compatible node identifier including a first virtual network identifier assigned to said at least one of other mobile computers which moves between networks and a node identifier of said at least one of other mobile computers, the compatible position identifier including a second network identifier which is usable only by mobile computers assigned to a network to which said at least one of other mobile computers is connected and the node identifier of said at least one of other mobile computers;

determining unit configured to determine whether the binding information is to be used for a packet transmitting or receiving operation; and conversion unit configured to perform, when said determining unit determines that the binding information is to be used, a conversion operation by converting the compatible node identifier to the compatible position identifier when the packet is to be transmitted and by converting from the compatible position identifier to the compatible node identifier when the packet is to be received.

* * * * *